(12) United States Patent
Kim et al.

(10) Patent No.: US 12,527,102 B2
(45) Date of Patent: Jan. 13, 2026

(54) IMAGE SENSOR

(71) Applicant: SAMSUNG ELECTRONICS CO., LTD., Suwon-si (KR)

(72) Inventors: Daekwan Kim, Suwon-si (KR); Jangho Moon, Suwon-si (KR); Yohwan Noh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 18/139,013

(22) Filed: Apr. 25, 2023

(65) Prior Publication Data
US 2024/0047488 A1 Feb. 8, 2024

(30) Foreign Application Priority Data

Aug. 8, 2022 (KR) .................. 10-2022-0098853
Jan. 13, 2023 (KR) .................. 10-2023-0005715

(51) Int. Cl.
| | |
|---|---|
| *H04N 23/84* | (2023.01) |
| *H04N 25/10* | (2023.01) |
| *H04N 25/587* | (2023.01) |
| *H10F 39/00* | (2025.01) |
| *H10F 39/18* | (2025.01) |

(52) U.S. Cl.
CPC ......... *H10F 39/8027* (2025.01); *H04N 23/84* (2023.01); *H04N 25/10* (2023.01); *H04N 25/587* (2023.01); *H10F 39/182* (2025.01); *H10F 39/806* (2025.01)

(58) Field of Classification Search
None
See application file for complete search history.

(56) References Cited

U.S. PATENT DOCUMENTS

| | | | |
|---|---|---|---|
| 9,122,007 B2 | 9/2015 | Mary et al. | |
| 11,323,640 B2* | 5/2022 | Kim | H04N 25/46 |
| 11,367,743 B2* | 6/2022 | Yang | H10F 39/8053 |
| 2021/0125301 A1 | 4/2021 | Park et al. | |
| 2021/0126032 A1 | 4/2021 | Roh et al. | |
| 2021/0167110 A1 | 6/2021 | Roh et al. | |
| 2021/0392303 A1 | 12/2021 | Park et al. | |
| 2021/0409659 A1* | 12/2021 | Powell | H04N 25/133 |
| 2022/0038662 A1* | 2/2022 | Tsuchimoto | H04N 25/47 |
| 2022/0224820 A1* | 7/2022 | Liu | H04N 25/134 |
| 2022/0345606 A1* | 10/2022 | Sato | H04N 23/72 |

FOREIGN PATENT DOCUMENTS

KR 10-2022-0058389 A 5/2022

* cited by examiner

*Primary Examiner* — James M Hannett
(74) *Attorney, Agent, or Firm* — Sughrue Mion, PLLC

(57) ABSTRACT

In some embodiments of the present disclosure, an image sensor includes a first pixel group and a second pixel group disposed in a substrate. The first pixel group includes a first plurality of first sub-groups configured to sense first light of a first color, and a plurality of second sub-groups configured to sense second light of a second color. The second pixel group is arranged adjacent to the first pixel group and includes a second plurality of first sub-groups configured to sense fourth light of the first color, and a plurality of third sub-groups configured to sense third light of a third color. Each of the first plurality of first sub-groups, the second plurality of first sub-groups, the plurality of second sub-groups, and the plurality of third sub-groups including pixels arranged in corresponding N rows and M columns, N and M being positive integers greater than one.

9 Claims, 32 Drawing Sheets

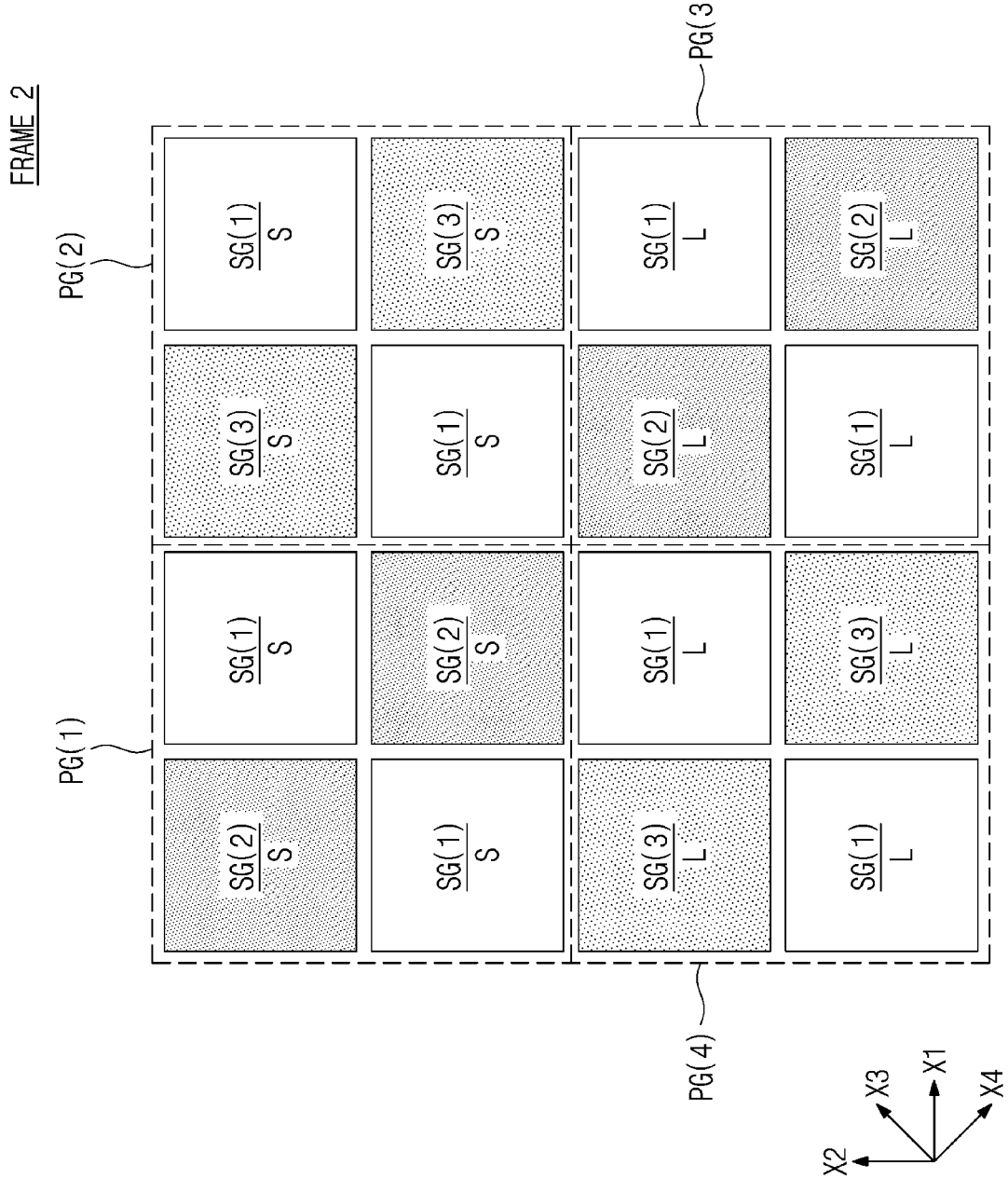

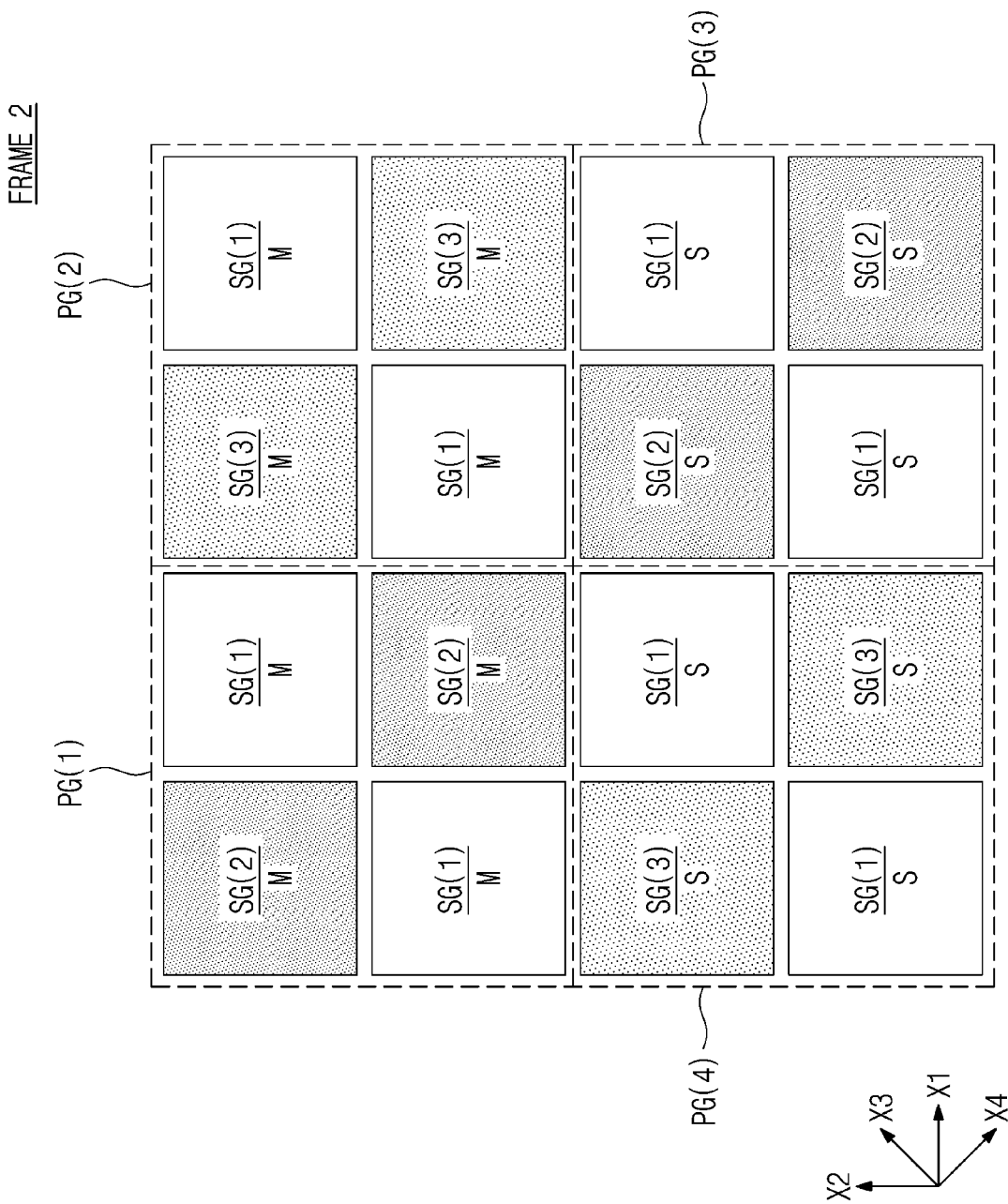

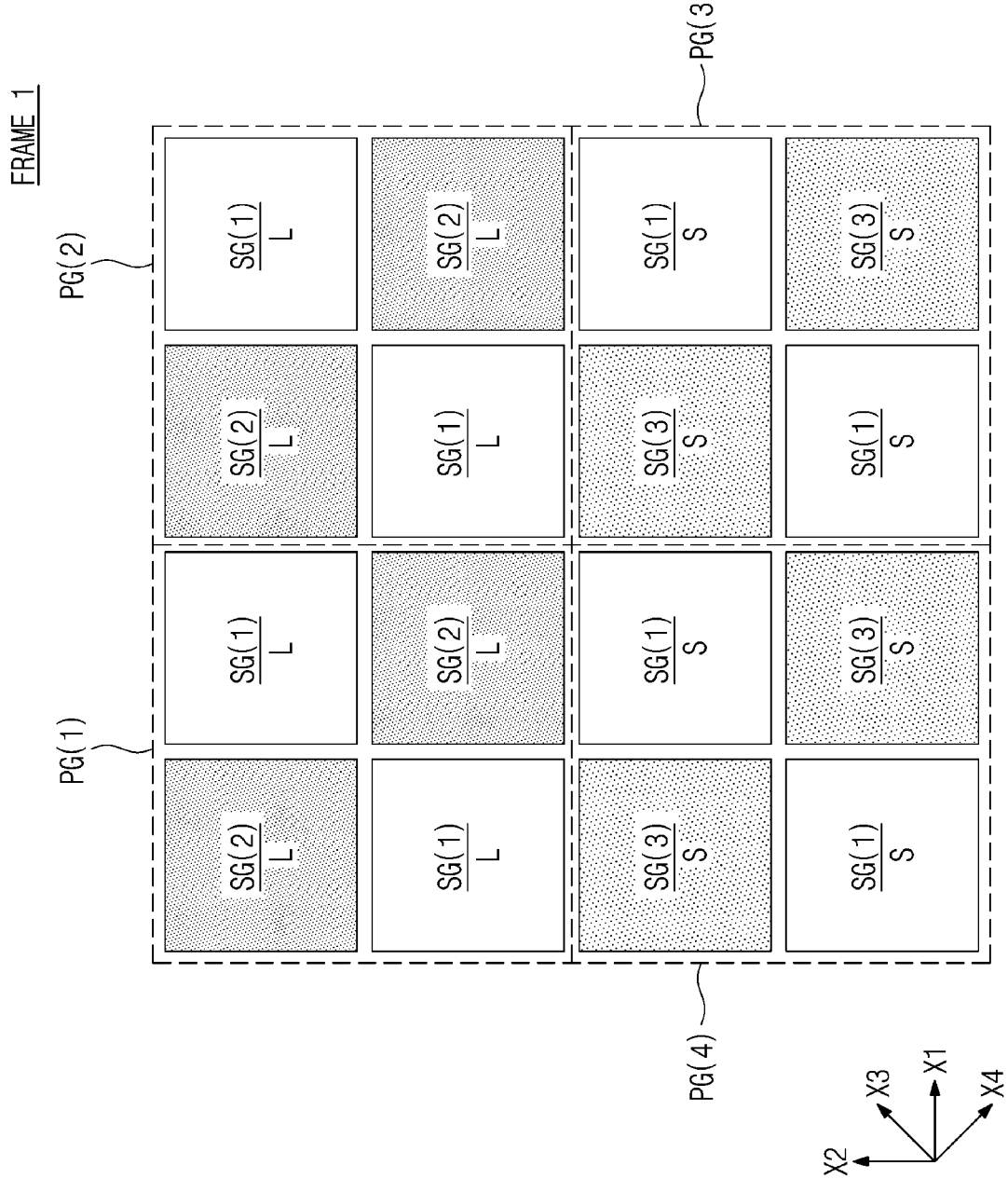

IMAGE SENSOR

CROSS-REFERENCE TO RELATED APPLICATIONS

This application claims benefit of priority under 35 U.S.C. § 119 to Korean Patent Application No. 10-2022-0098853, filed on Aug. 8, 2022, and to Korean Patent Application No. 10-2023-0005715, filed on Jan. 13, 2023, in the Korean Intellectual Property Office, the disclosures of which are incorporated by reference herein in their entireties.

BACKGROUND

1. Field

The present disclosure relates generally to image sensors, and more particularly, to image sensors having a high dynamic range (HDR).

2. Description of Related Art

An image sensor may refer a semiconductor device for converting an optical image into electrical signals. Image sensors may be categorized as charge coupled device (CCD) image sensors and/or complementary metal-oxide-semiconductor (CMOS) image sensors. A CMOS image sensor (CIS) may include a plurality of pixels that may be two-dimensionally (2D) arranged. Each of the pixels of the plurality of pixels may include a photodiode (PD). The photodiode may be configured to convert incident light into an electrical signal.

SUMMARY

Embodiments of the present disclosure may provide an image sensor capable of realizing clear image quality.

According to an aspect of the present disclosure, an image sensor is provided. The image sensor includes a first pixel group disposed in a substrate, and a second pixel group disposed in the substrate and arranged adjacent to first pixel group. The first pixel group includes a first plurality of first sub-groups configured to sense first light of a first color, and a plurality of second sub-groups configured to sense second light of a second color. Each of the first plurality of first sub-groups includes first pixels arranged in N first rows and M first columns, where N and M are positive integers greater than one. Each of the plurality of second sub-groups includes second pixels arranged in N second rows and M second columns. The second pixel group includes a second plurality of first sub-groups configured to sense fourth light of the first color, and a plurality of third sub-groups configured to sense third light of a third color. Each of the second plurality of first sub-groups includes other first pixels arranged in N fourth rows and M fourth columns. Each of the plurality of third sub-groups includes third pixels arranged in N third rows and M third columns.

According to an aspect of the present disclosure, an image sensor is provided. The image sensor includes a first pixel group, a second pixel group, a third pixel group, and a fourth pixel group which are disposed in a substrate and arranged in a clockwise direction. Each of the first pixel group and the third pixel group includes a first plurality of first sub-groups configured to sense first light of a first color, and a plurality of second sub-groups configured to sense second light of a second color. Each of the second pixel group and the fourth pixel group includes a second plurality of first sub-groups, and a plurality of third sub-groups configured to sense third light of a third color. Each of the first sub-groups includes first pixels arranged in N first rows and M first columns. Each of the plurality of second sub-groups includes second pixels arranged in N second rows and M second columns. Each of the plurality of third sub-groups includes third pixels arranged in N third rows and M third columns. N and M are a positive integer greater than one. At least one of the first sub-groups is disposed between at least one of the plurality of second sub-groups and at least one of the plurality of third sub-groups.

According to an aspect of the present disclosure, an image sensor is provided. The image sensor includes a first pixel group disposed in a substrate, a second pixel group disposed in the substrate and arranged adjacent to the first pixel group, first high-refractive patterns disposed on the substrate and respectively overlapping the first pixels, second high-refractive patterns disposed on the substrate and respectively overlapping centers of the plurality of second sub-groups, a planarization layer covering at least a portion of the first high-refractive patterns and the second high-refractive patterns, third high-refractive patterns disposed on the planarization layer and respectively overlapping the first high-refractive patterns, and fourth high-refractive patterns disposed on the planarization layer and respectively overlapping the second high-refractive patterns. The first pixel group includes a first plurality of first sub-groups configured to sense first light of a first color, and a plurality of second sub-groups configured to sense second light of a second color. Each of the first plurality of first sub-groups includes first pixels arranged in N first rows and M first columns. N and M are positive integers greater than one. Each of the plurality of second sub-groups includes second pixels arranged in N second rows and M second columns. The second pixel group includes a second plurality of first sub-groups, and a plurality of third sub-groups configured to sense third light of a third color. Each of the plurality of third sub-groups includes third pixels arranged in N rows and M columns.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A and 10B are views illustrating operation states of an image sensor having the active pixel sensor array of FIG. 3, according to an embodiment;

FIGS. 12A and 12B are views illustrating operation states of an image sensor having the active pixel sensor array of FIG. 3, according to an embodiment;

FIGS. 19A and 19B are views illustrating operation states of an image sensor having the active pixel sensor array of FIG. 18, according to an embodiment;

DETAILED DESCRIPTION

Figure 1:
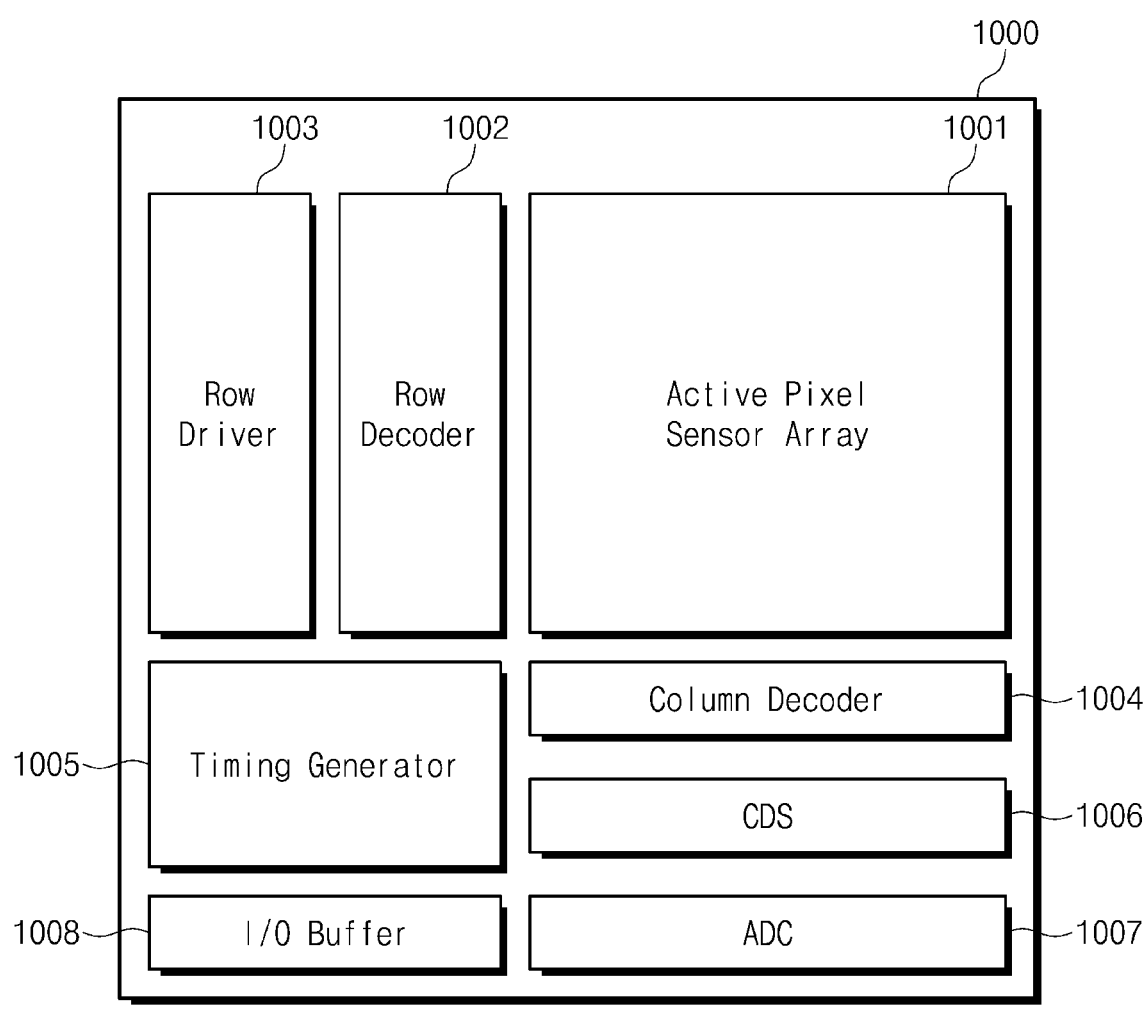
FIG. 1 is a block diagram illustrating an image sensor, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The terms "upper," "middle", "lower", etc. may be replaced with terms, such as "first," "second," third" to be used to describe relative positions of elements. The terms "first," "second," third" may be used to describe various elements but the elements are not limited by the terms and a "first element" may be referred to as a "second element". Alternatively or additionally, the terms "first", "second", "third", etc. may be used to distinguish components from each other and do not limit the present disclosure. For example, the terms "first", "second", "third", etc. may not necessarily involve an order or a numerical meaning of any form.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

As used herein, each of the terms "SiO", "SiN", "SiCN", SiON", and the like may refer to a material made of elements included in each of the terms and is not a chemical formula representing a stoichiometric relationship Example embodiments of the present disclosure are described below with reference to the accompanying drawings.

FIG. 1 is a block diagram illustrating an image sensor, according to an embodiment.

Referring to FIG. 1, an image sensor 1000 may receive light from the outside to generate a digital signal. In an embodiment, an electronic device including the image sensor 1000 may display an image on a display panel on the basis of the digital signal. For example, the electronic device including the image sensor 1000 may be realized as one of various electronic devices such as, but not limited to, a smart phone, a tablet personal computer (tablet PC), a laptop personal computer (laptop PC), and a wearable device.

In an embodiment, the image sensor 1000 may include an active pixel sensor array 1001, a row decoder 1002, a row driver 1003, a column decoder 1004, a timing generator 1005, a correlated double sampler (CDS) 1006, an analog-to-digital converter (ADC) 1007, and an input/output (I/O) buffer 1008.

The active pixel sensor array 1001 may include a plurality of pixels arranged two-dimensionally (2D) and may convert optical signals into electrical signals. In an embodiment, the active pixel sensor array 1001 may be driven by a plurality of driving signals (e.g., a pixel selection signal, a reset signal, a charge transfer signal) provided from the row driver 1003. Alternatively or additionally, the converted electrical signals may be provided to the correlated double sampler 1006.

The row driver 1003 may provide a plurality of driving signals for driving a plurality of the pixels of the active pixel sensor array 1001 in response to signals decoded in the row decoder 1002. In an embodiment, when the pixels are arranged in a matrix form (e.g., rows and/or columns), the driving signals may be provided in the unit of row of the matrix. That is, a driving signal of the row driver 1003 may be provided to a corresponding row of the matrix in which the pixels are arranged.

The timing generator 1005 may provide timing signals and/or control signals to the row decoder 1002 and the column decoder 1004.

The correlated double sampler 1006 may receive electrical signals generated by the active pixel sensor array 1001 and may hold and sample the received electrical signals. For example, the correlated double sampler 1006 may doubly sample a specific noise level and a signal level of the electrical signal to output a difference level corresponding to a difference between the noise level and the signal level.

The analog-to-digital converter 1007 may convert an analog signal, which may correspond to the difference level outputted from the correlated double sampler 1006, into a digital signal and may output the digital signal.

The I/O buffer 1008 may latch the digital signals, and the latched digital signals may be sequentially outputted (e.g., to an image signal processing unit) in response to signals decoded in the column decoder 1004.

Figure 2:
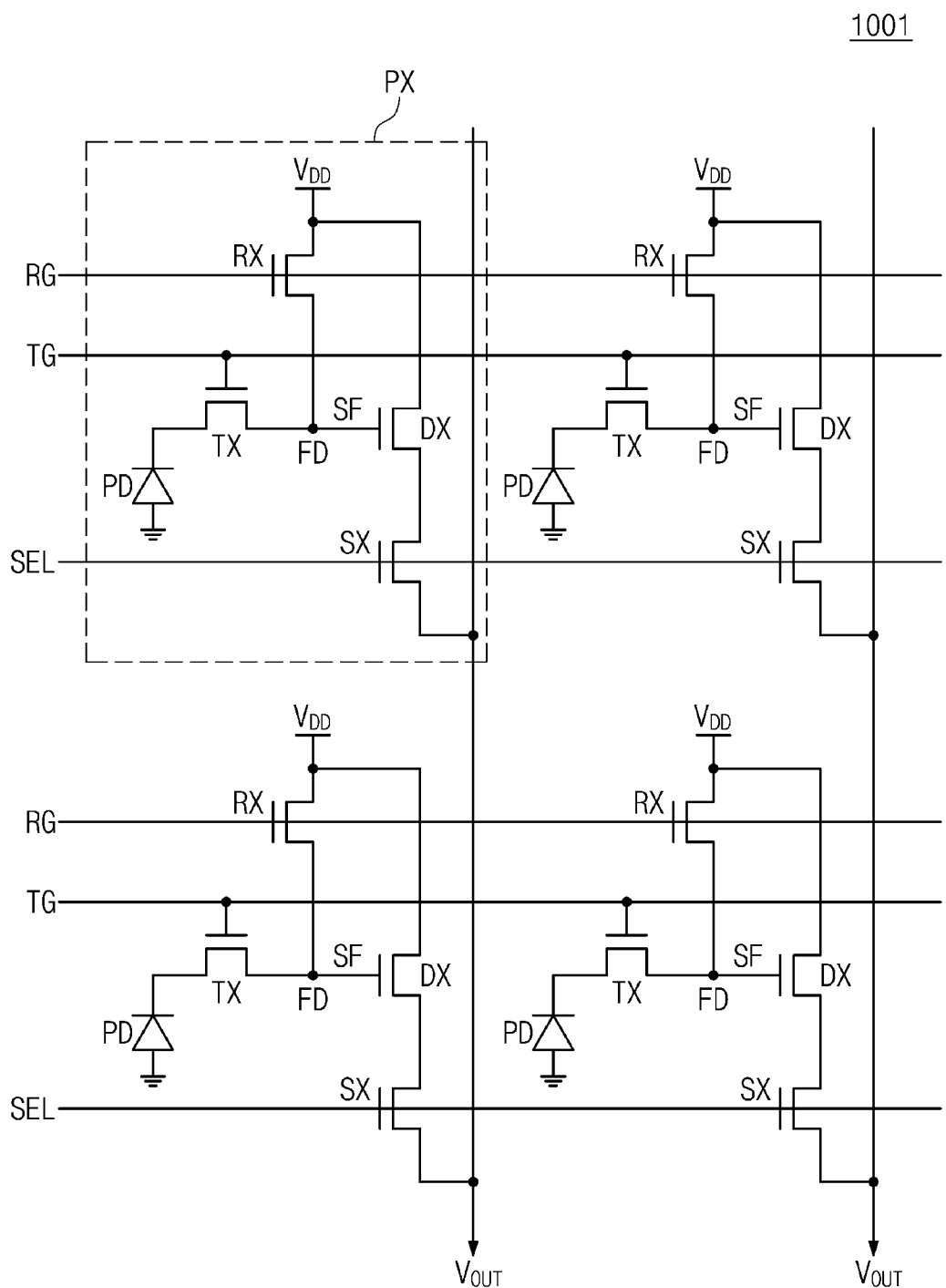
FIG. 2 is a circuit diagram illustrating an active pixel sensor array of an image sensor, according to an embodiment.

FIG. 2 is a circuit diagram illustrating an active pixel sensor array of an image sensor, according to an embodiment.

Referring to FIGS. 1 and 2, the active pixel sensor array 1001 may include a plurality of pixels PX. In an embodiment, the plurality of pixels PX may be arranged in a matrix form. Alternatively or additionally, each of the pixels PX may include a transfer transistor TX and logic transistors RX, SX and DX. The logic transistors RX, SX and DX may include a reset transistor RX, a selection transistor SX, and a source follower transistor DX. The transfer transistor TX may include a transfer gate TG. Alternatively or additionally, each of the pixels PX may include a photoelectric conversion portion PD and a floating diffusion region FD. In some embodiments, the logic transistors RX, SX and DX may be shared by a plurality of the pixels PX adjacent to each other.

The photoelectric conversion portion PD may generate and/or accumulate photocharges in proportion to the amount of light incident from the outside. The photoelectric conversion portion PD may include, but not be limited to, a photodiode, a photo transistor, a photo gate, a pinned photodiode, or a combination thereof. The transfer transistor TX may transfer charges generated in the photoelectric conversion portion PD to the floating diffusion region FD. The floating diffusion region FD may receive the charges generated in the photoelectric conversion portion PD and may cumulatively store the received charges. Alternatively or additionally, the source follower transistor DX may be controlled according to the amount of the photocharges accumulated in the floating diffusion region FD.

The reset transistor RX may periodically reset the charges accumulated in the floating diffusion region FD. In an embodiment, a drain electrode of the reset transistor RX may be connected to the floating diffusion region FD, and a source electrode of the reset transistor RX may be connected to a power voltage $V_{DD}$. Alternatively or additionally, when the reset transistor RX is turned-on, the power voltage $V_{DD}$ connected to the source electrode of the reset transistor RX may be applied to the floating diffusion region FD. Thus, when the reset transistor RX is turned-on, the charges accumulated in the floating diffusion region FD may be discharged to reset the floating diffusion region FD.

The source follower transistor DX including a source follower gate electrode SF may function as a source follower buffer amplifier. For example, the source follower transistor DX may amplify a potential change in the floating diffusion region FD and may output the amplified potential change to an output line $V_{OUT}$.

In an embodiment, the selection transistor SX including a selection gate electrode SEL may select the pixels PX to be sensed in the unit of row. For example, when the selection transistor SX is turned-on, the power voltage $V_{DD}$ may be applied to a drain electrode of the source follower transistor DX.

Figure 3:
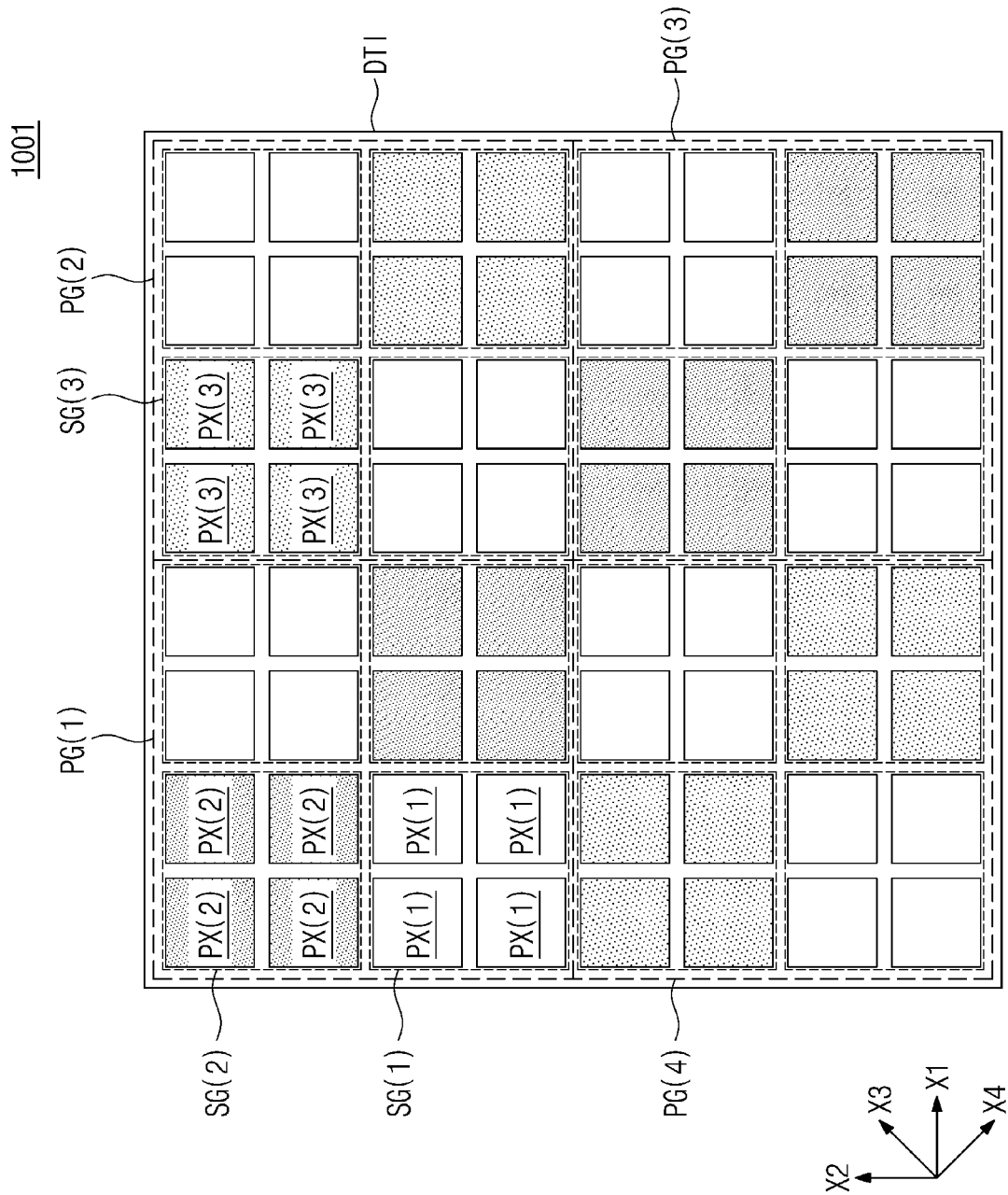
FIG. 3 is a plan view illustrating an active pixel sensor array of an image sensor, according to an embodiment.

FIG. 3 is a plan view illustrating an active pixel sensor array of an image sensor, according to an embodiment.

Referring to FIG. 3, in an active pixel sensor array 1001, a pixel isolation portion DTI may be disposed in a substrate (e.g., substrate 1 of FIG. 5) to isolate a plurality of pixels PX from each other. A plurality of adjacent pixels PX may constitute a sub-group SG. In an embodiment, the active pixel sensor array 1001 may comprise a plurality of sub-groups SG, each with a corresponding plurality of adjacent pixels PX. A plurality of adjacent sub-groups SG may constitute a pixel group PG.

In an embodiment, the active pixel sensor array 1001 may comprise a plurality of pixel groups PG. For example, each pixel group PG may include four (4) pixel groups (e.g., a first pixel group PG(1), a second pixel group PG(2), a third PG(3), and a fourth pixel group PG(4)) arranged in a clockwise direction. Alternatively or additionally, the first and second pixel groups PG(1) and PG(2) may be arranged in a first direction X1. In an embodiment, the fourth and first pixel groups PG(4) and PG(1) may be arranged in a second direction X2 intersecting the first direction X1. In an optional or additional embodiment, the fourth and second pixel groups PG(4) and PG(2) may be arranged in a third direction X3 intersecting both the first direction X1 and the second direction X2. In another optional or additional embodiment, the first and third pixel groups PG(1) and PG(3) may be arranged in a fourth direction X4 intersecting the first to third directions X1, X2 and X3. However, the present disclosure is not limited in this regard. For example, the first to fourth pixel groups PG(1) to PG(4) may be arranged in other configurations without departing from the scope of the present disclosure.

Referring to FIG. 3, each of the first and third pixel groups PG(1) and PG(3) may include first and second sub-groups SG(1) and SG(2) and may be arranged in two rows and two columns. In an embodiment, each of the first sub-groups SG(1) may include first pixels PX(1) which may be used to sense first light of a first color and may be arranged in two rows and two columns. Alternatively or additionally, each of the second sub-groups SG(2) may include second pixels PX(2) which may be used to sense second light of a second color and may be arranged in two rows and two columns. For example, the first light of the first color may be light of a green wavelength. For another example, the second light of the second color may be light of a red wavelength. In an optional or additional embodiment, in each of the first and third pixel groups PG(1) and PG(3), the first sub-groups SG(1) may be arranged in the third direction X3. Alternatively or additionally, the second sub-groups SG(2) may be arranged in the fourth direction X4. Throughout the present disclosure, light may also be referred to as a photon.

Continuing to refer to FIG. 3, each of the fourth and second pixel groups PG(4) and PG(2) may include first and third sub-groups SG(1) and SG(3) and may be arranged in two rows and two columns. Alternatively or additionally, each of the third sub-groups SG(3) may include third pixels PX(3) which may be used to sense third light of a third color and may be arranged in two rows and two columns. For example, the third light of the third color may be light of a blue wavelength. In an optional or additional embodiment, in each of the fourth and second pixel groups PG(4) and PG(2), the first sub-groups SG(1) may be arranged in the third direction X3. Alternatively or additionally, the third sub-groups SG(3) may be arranged in the fourth direction X4.

As described above with reference to FIG. 3, the pixels included in each of the sub-groups SG may be arranged in two rows and two columns. However the present disclosure is not limited thereto. For example, in certain embodiments, the pixels included in one sub-group SG may be arranged in N rows and M columns, where N and M may be positive integers greater than one (1). In some embodiments, N and M may be equal to each other. Alternatively or additionally, N and M may differ from each other.

In an embodiment, the first and third pixel groups PG(1) and PG(3) may exclude the third sub-groups SG(3). That is, the first and third pixel groups PG(1) and PG(3) may not and/or may be prevented to sense the third light. Alternatively or additionally, the fourth and second pixel groups PG(4) and PG(2) may exclude the second sub-groups SG(2). That is, the fourth and second pixel groups PG(4) and PG(2) may not and/or may be prevented to sense the second light.

Figure 4A:
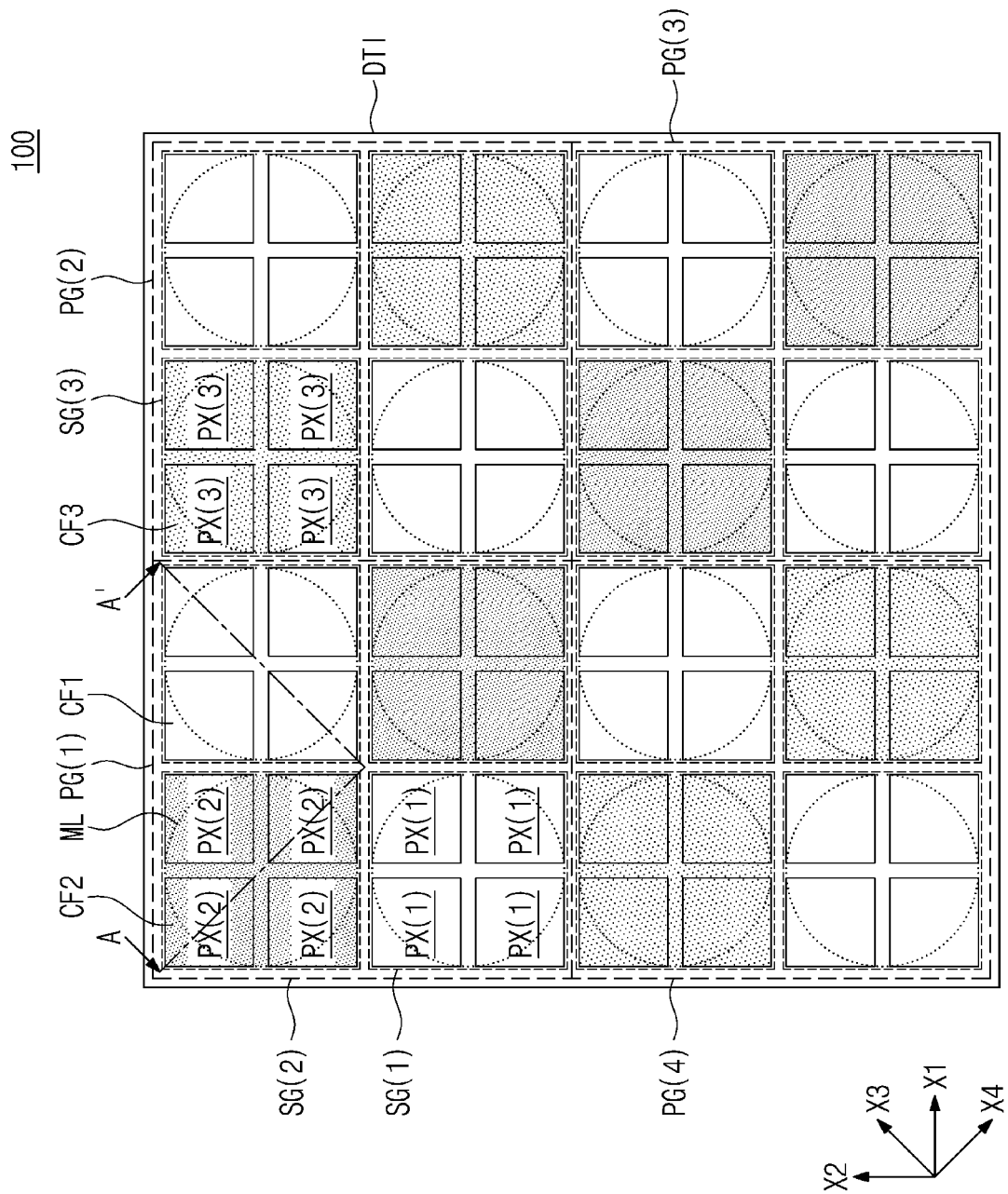
FIG. 4A is a plan view illustrating an image sensor, according to an embodiment.
Figure 4B:
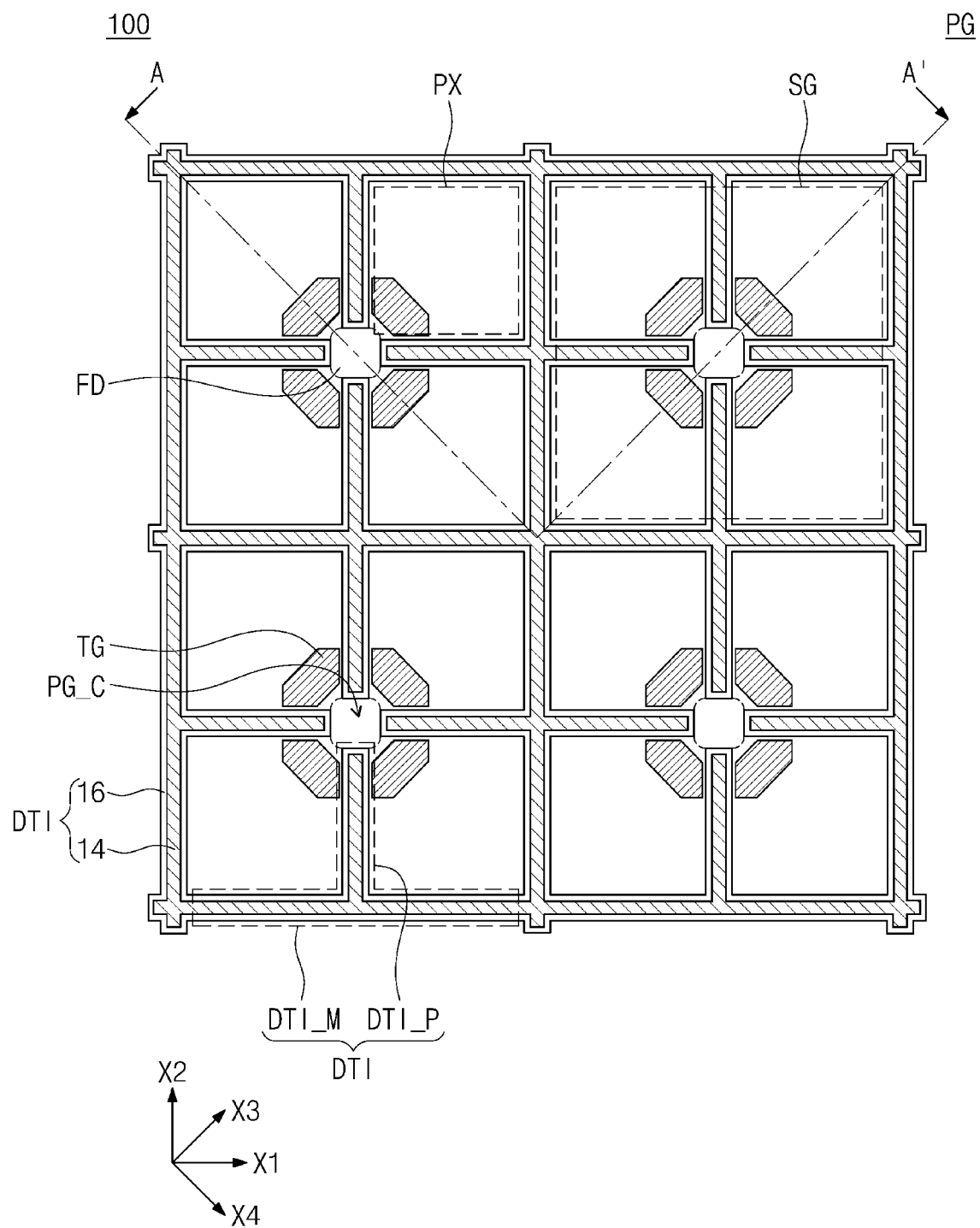
FIG. 4B is a detailed plan view illustrating a pixel group included in an image sensor, according to an embodiment.
Figure 5:
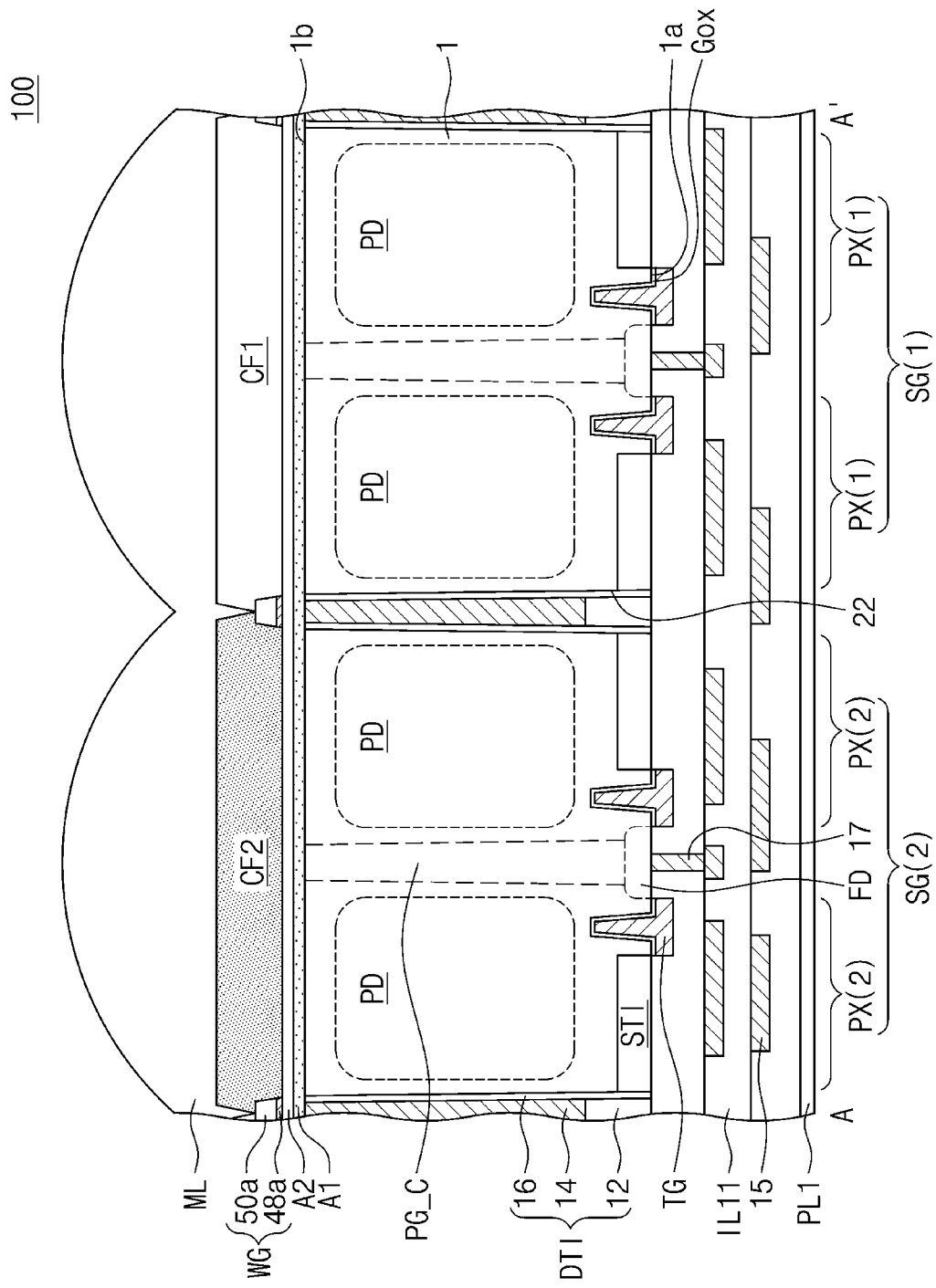
FIG. 5 is a cross-sectional view taken along a line A-A' of FIG. 4A or 4B, according to an embodiment.

FIG. 4A is a plan view illustrating an image sensor, according to an embodiment. FIG. 4B is a detailed plan view illustrating a pixel group included in an image sensor, according to an embodiment. FIG. 5 is a cross-sectional view taken along a line A-A' of FIG. 4A or 4B. An image sensor 100 of FIGS. 4A, 4B and 5 may include or may be similar in many respects to the image sensor 1000 described above with reference to FIGS. 1 to 3, and may include additional features not mentioned above.

Referring to FIGS. 4A, 4B and 5, the image sensor 100 may include a first substrate 1. Regions for the blocks described with reference to FIG. 1 may be provided in the first substrate 1. For example, the first substrate 1 may include, but not be limited to, a single-crystalline silicon wafer, a silicon epitaxial layer, or a silicon-on-insulator (SOI) substrate. Alternatively or additionally, the first substrate 1 may be doped with dopants having a first conductivity type. For another example, the first conductivity type may be a P-type. In an embodiment, the first substrate 1 may include a front surface 1a and a back surface 1b, which may be opposite from each other. In the present disclosure, the front surface 1a may be referred to as a first surface 1a, and/or the back surface 1b may be referred to as a second surface 1b. In an embodiment, the first substrate 1 may include a plurality of pixels PX.

The pixel groups PG, the sub-groups SG and the pixels PX described with reference to FIG. 3 may be disposed in an active pixel sensor array region of the first substrate 1. In an embodiment, pixel isolation portion DTI may have a mesh shape when viewed in a plan view.

In an embodiment, the pixel isolation portion DTI may include a pixel group isolation portion DTI_M and a pixel isolation portion DTI_P. The pixel group isolation portion DTI_M may be disposed between the sub-groups SG adjacent to each other and may isolate the adjacent sub-groups SG from each other. Alternatively or additionally, the pixel group isolation portion DTI_M may be disposed between the pixel groups PG adjacent to each other and may isolate the adjacent pixel groups PG from each other. The pixel isolation portion DTI_P may isolate the pixels PX from each other in each of the sub-groups SG. The pixel isolation portion DTI_P may protrude from a sidewall of the pixel group isolation portion DTI_M toward a center PG_C of each of the sub-groups SG when viewed in a plan view. As shown in FIGS. 4B and 5, the pixel isolation portion DTI_P may not exist at (e.g., may be omitted from) the center PG_C of the sub-group SG. Thus, the pixel isolation portions DTI_P may be spaced apart from each other at the center PG_C of each of the sub-groups SG.

In an embodiment, the pixel isolation portion DTI may be located in a deep trench 22 formed from the front surface 1a toward the back surface 1b of the first substrate 1. The pixel isolation portion DTI may include a filling insulation pattern 12, an isolation insulating pattern 16, and an isolation conductive pattern 14. The filling insulation pattern 12 may be disposed between the isolation conductive pattern 14 and a first interlayer insulating layer IL11. The isolation insulating pattern 16 may be disposed between the isolation conductive pattern 14 and the first substrate 1 and between the filling insulation pattern 12 and the first substrate 1.

Each of the filling insulation pattern 12 and the isolation insulating pattern 16 may be formed of an insulating material having a refractive index different from that of the first substrate 1. For example, the filling insulation pattern 12 and the isolation insulating pattern 16 may include, but not be limited to, silicon oxide (SiO). In an embodiment, the isolation conductive pattern 14 may be spaced apart from the first substrate 1. Alternatively or additionally, the isolation conductive pattern 14 may include, but not be limited to, a poly-silicon layer or silicon-germanium layer, which may be doped with dopants. For example, the dopants doped in the poly-silicon layer and/or silicon-germanium (Si—Ge) layer may include, but not be limited to, boron (B), phosphorus (P), or arsenic (As). Alternatively or additionally, the isolation conductive pattern 14 may include a metal layer.

In an embodiment, a negative bias voltage may be applied to the isolation conductive pattern 14. That is, the isolation conductive pattern 14 may function as a common bias line. As a result, it may be possible to capture holes which may exist at a surface of the first substrate 1 being in contact with the pixel isolation portion DTI, and thus a dark current may be reduced.

In an embodiment, the pixel isolation portion DTI may have a width becoming narrower from the front surface 1a toward the back surface 1b of the first substrate 1.

Photoelectric conversion portions PD may be disposed in the first substrate 1 of the pixels PX, respectively. In an embodiment, the photoelectric conversion portions PD may be doped with dopants having a second conductivity type opposite to the first conductivity type. For example, the second conductivity type may be an N-type. The N-type dopants included in the photoelectric conversion portion PD may form a PN junction with the P-type dopants included in the first substrate 1 around the photoelectric conversion portion PD and, thus, a photodiode may be provided.

Device isolation portions STI adjacent to the front surface 1a may be disposed in the first substrate 1. For example, the pixel isolation portion DTI may penetrate the device isolation portions STI. The device isolation portion STI may define active regions adjacent to the front surface 1a in each of the pixels PX. For example, the active regions may be provided for the transistors TX, RX, DX and SX of FIG. 2.

Referring to FIG. 4B, a transfer gate TG may be disposed on the front surface 1a of the first substrate 1 in each of the pixels PX. In the pixels PX included in each of the sub-groups SG, the transfer gates TG may be disposed adjacent to the center PG_C of each of the sub-groups SG. A portion of the transfer gate TG may extend into the first substrate 1. The transfer gate TG may be a vertical type gate. Alternatively or additionally, the transfer gate TG may not extend into the first substrate 1 but may consist of a planar type gate having a flat shape. A gate insulating layer Gox (shown in FIG. 5) may be disposed between the transfer gate TG and the first substrate 1. A floating diffusion region FD adjacent to the front surface 1a may be disposed in the first substrate 1 of the center PG_C of each of the sub-groups SG. For example, the floating diffusion region FD may be doped with dopants having the second conductivity type. Alternatively or additionally, the floating diffusion region FD may be adjacent to four transfer gates TG. In an embodiment, the four (4) pixels PX constituting each of the sub-groups SG may share the floating diffusion region FD.

In an embodiment, the image sensor 100 may include a backside illuminated image sensor. For example, light may be incident into the first substrate 1 through the back surface 1b of the first substrate 1. In such an example, electron-hole pairs (EHPs) may be generated in a depletion region of the PN junction by the incident light. The generated electrons may move into the photoelectric conversion portion PD. When a voltage is applied to the transfer gate TG, the electrons may be moved into the floating diffusion region FD.

In some embodiments, the reset transistor RX, the selection transistor SX and the source follower transistor DX may be disposed on the front surface 1a of the pixels PX.

Referring to FIG. 5, first interlayer insulating layers IL11 may be disposed on the front surface 1a. Each of the first interlayer insulating layers IL11 may include, but not be limited to, at least one of a silicon oxide (SiO) layer, a silicon nitride (SiN) layer, a silicon carbon-nitride (SiCN) layer, a silicon oxynitride (SiON) layer, and a porous low-k dielectric layer. In an embodiment, first interconnection lines 15 may be disposed between and/or in the first interlayer insulating layers IL11. Alternatively or additionally, the floating diffusion region FD may be connected to a corresponding one of the first interconnection lines 15 through a first contact plug 17. The first contact plug 17 may penetrate (e.g., uppermost) one of the first interlayer insulating layers IL11, which may be closest to the front surface 1a. Alternatively or additionally, a lowermost one of the first interlayer insulating layers IL11 may be covered at least in part with a passivation layer PL1. The passivation layer PL1 may have a single-layered and/or multi-layered structure and may include, but not be limited to, at least one of SiO, SiCN, SiON, SiN, and a combination thereof.

A fixed charge layer A1 and an anti-reflection layer A2 may sequentially cover at least a portion of the back surface 1b of the first substrate 1. The fixed charge layer A1 may be in contact with the back surface 1b. The fixed charge layer A1 may have negative fixed charges. The fixed charge layer A1 may be formed of a metal oxide and/or a metal fluoride including, but not limited to, at least one of hafnium (Hf), zirconium (Zr), aluminum (Al), tantalum (Ta), titanium (Ti), yttrium (Y), and a lanthanoid. For example, the fixed charge layer A1 may be a hafnium oxide layer and/or an aluminum oxide layer. In embodiments of the present disclosure, holes may be accumulated in the vicinity of the fixed charge layer A1. Thus, a dark current and a white spot may be effectively reduced.

The anti-reflection layer A2 may have a single-layered and/or multi-layered structure including at least one of titanium oxide (TiO), silicon nitride (SiN), silicon oxide (SiO), or hafnium oxide (HfO).

A grid pattern WG may be disposed on the anti-reflection layer A2. The grid pattern WG may include a light blocking pattern 48a and a low-refractive pattern 50a, which may be sequentially stacked. In an embodiment, the grid pattern WG may overlap the pixel isolation portion DTI. The light blocking pattern 48a may include, but not be limited to, at least one of titanium (Ti), titanium nitride (TiN), or tungsten (W). The low-refractive pattern 50a may include a material having a refractive index less than refractive indexes of color filters (e.g., first color filter CF1, second color filter CF2, and third color filter CF3). For example, the low-refractive pattern 50a may have a refractive index of 1.3 or less. In an embodiment, sidewalls of the light blocking pattern 48a may be aligned with sidewalls of the low-refractive pattern 50a.

Color filters CF1, CF2 and CF3 may be disposed in openings defined by the grid pattern WG. The first color filter CF1 may have a first color and may cover at least a portion of the first sub-group SG(1). The second color filter CF2 may have a second color and may cover at least a portion of the second sub-group SG(2). The third color filter CF3 may have a third color and may cover at least a portion of the third sub-group SG(3). For example, the first color may be a green color, the second color may be a red color, and the third color may be a blue color. However, the present disclosure is not limited in this regard. For example, the first color, the second color, and the third color may correspond to different colors without deviating from the scope of the present disclosure.

Micro lenses ML may be disposed on the color filters CF1, CF2 and CF3, respectively. That is, one micro lens ML may be located on one sub-group SG. In an embodiment, each of the micro lenses ML may have a circular shape when viewed in a plan view.

In the image sensor, a voltage level or an output level of each of the pixels PX may be obtained to obtain an image in a full mode. Alternatively or additionally, the image sensor may process data by other methods described below.

Figure 6:
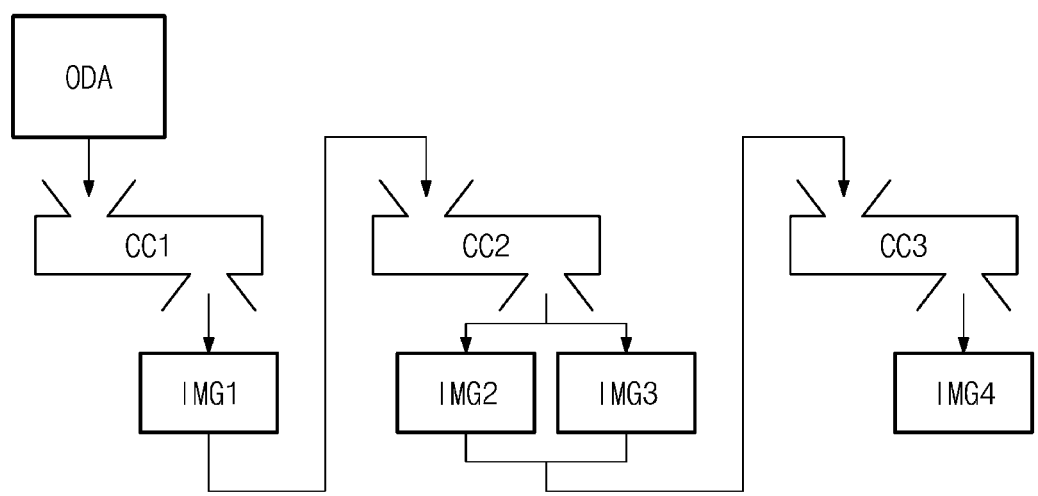
FIG. 6 is a block diagram illustrating a method of processing data in an image sensor, according to an embodiment.
Figure 7:
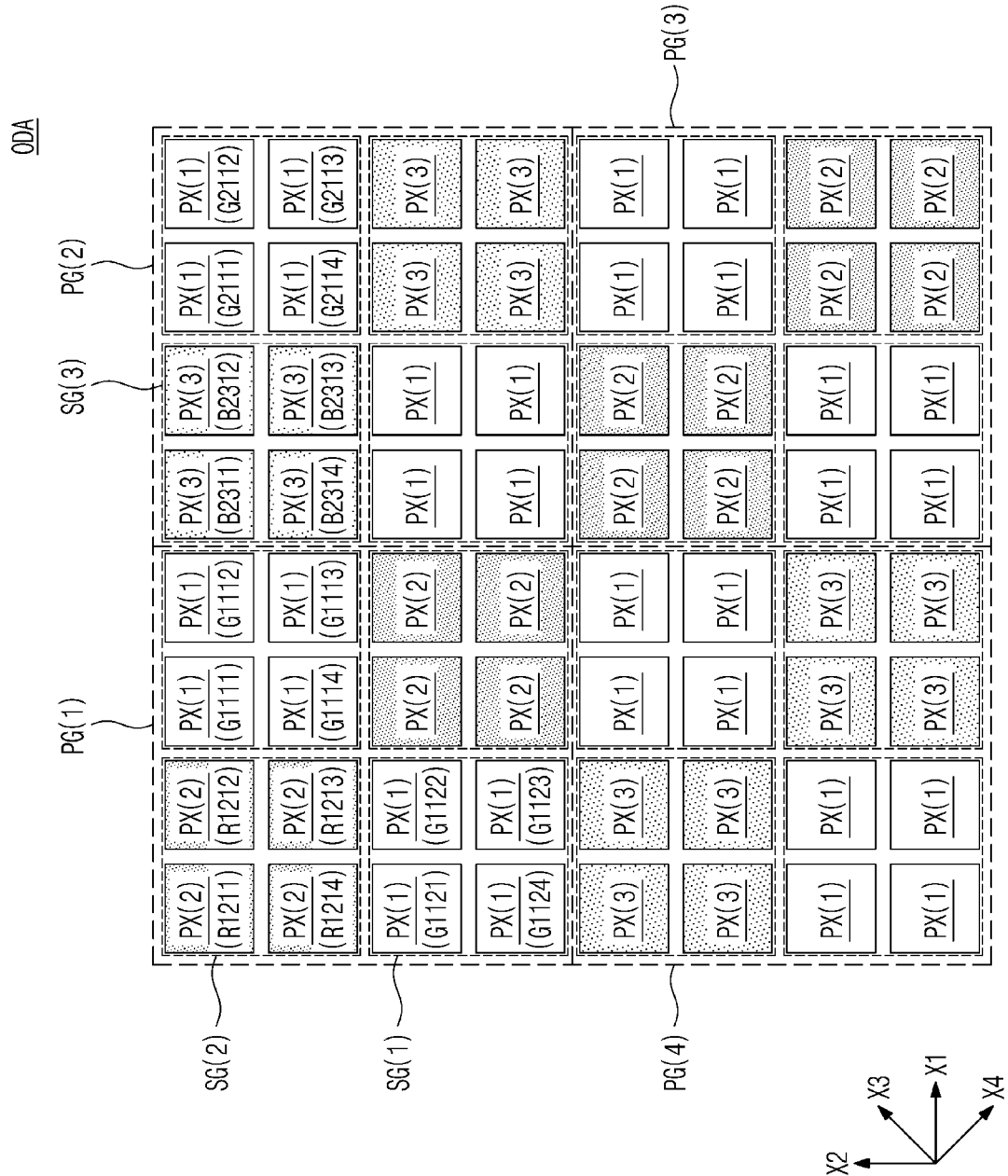
FIG. 7 illustrates original image data, according to an embodiment.
Figure 8:
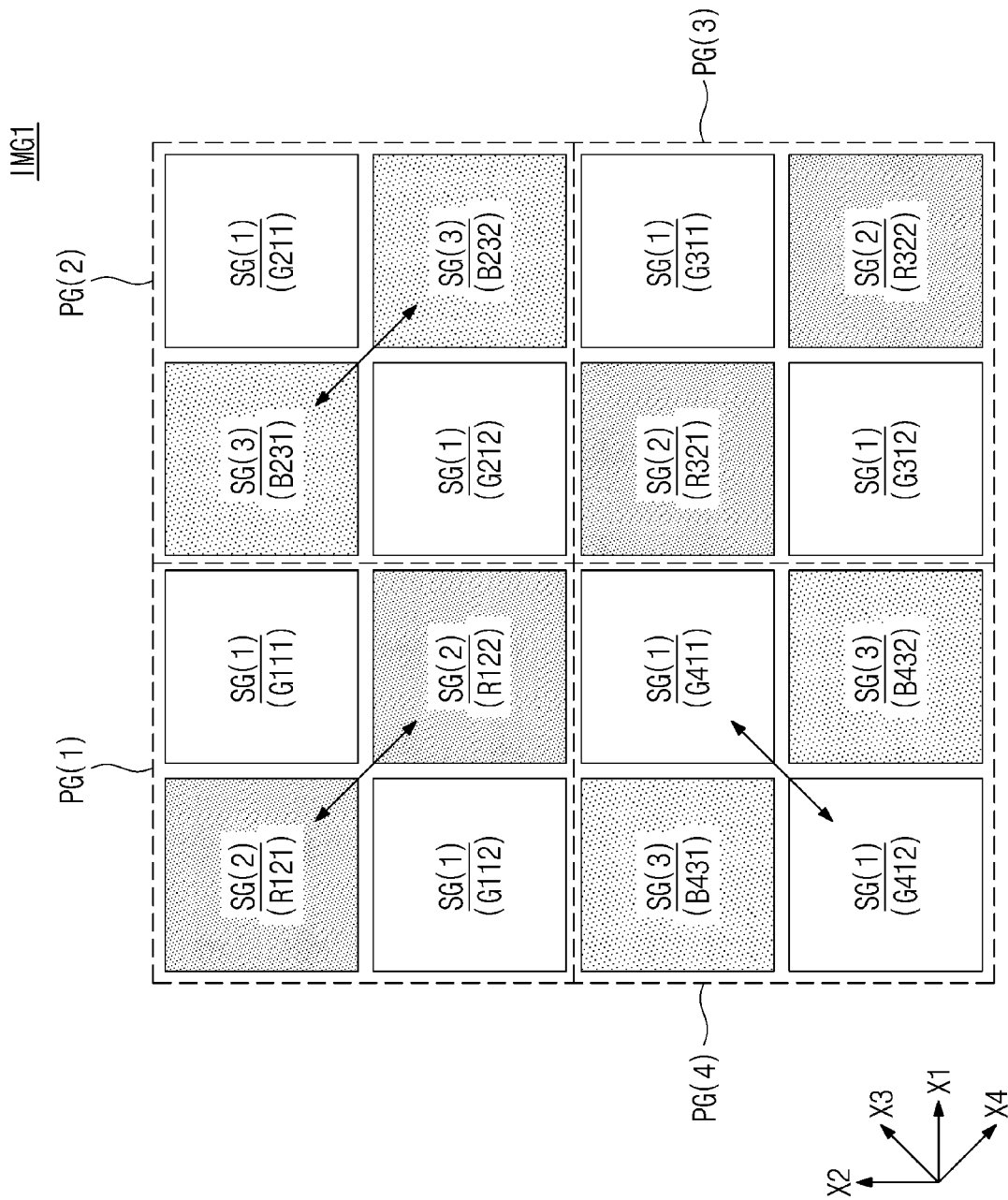
FIG. 8 illustrates first image data obtained from a first conversion circuit, according to an embodiment.
Figure 9:
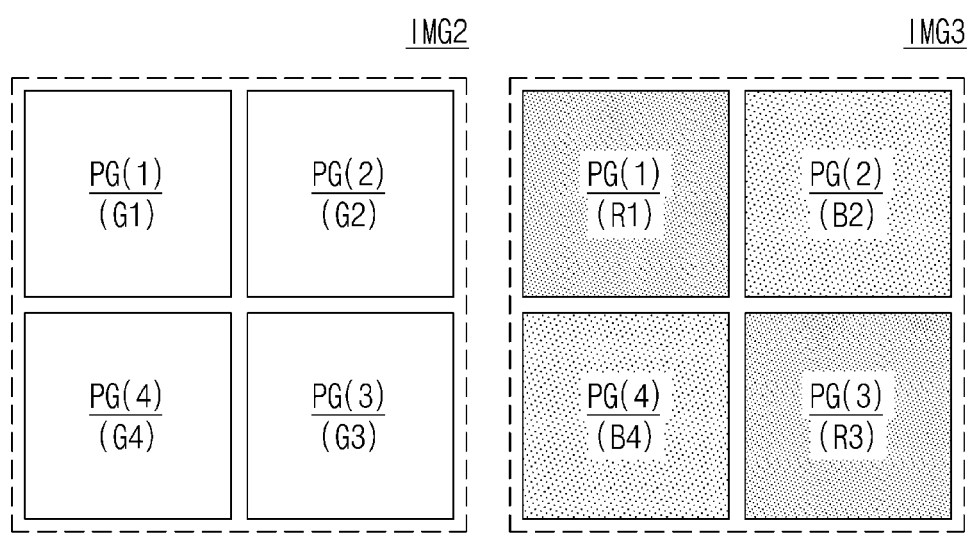
FIG. 9 illustrates second and third image data obtained from a second conversion circuit, according to an embodiment.

FIG. 6 is a block diagram illustrating a method of processing data in an image sensor, according to an embodiment. FIG. 7 illustrates original image data according to an embodiment. FIG. 8 illustrates first image data obtained from a first conversion circuit, according to an embodiment. FIG. 9 illustrates second and third image data obtained from a second conversion circuit, according to an embodiment.

Referring to FIGS. 3, 6 and 7, the image sensor may include a first conversion circuit CC1, a second conversion circuit CC2, and a third conversion circuit CC3. The first conversion circuit CC1 may perform a first binning from original image data ODA to obtain first image data IMG1.

For example, the active pixel sensor array 1001 may have the pixels PX, the sub-groups SG and the pixel groups PG, described with reference to FIGS. 3 to 5. Each of the pixels PX may receive light from the outside. Each of the pixels PX may store data on the received light. The active pixel sensor array 1001, according to an embodiment, may operate in the unit of the sub-group SG. That is, the image data stored in the pixels PX may be accessed (e.g., read) on a per subgroup SG basis. For example, each sub-group SG may output an electrical signal based on light received into the pixels PX included in the sub-group SG (e.g., four (4) pixels). The electrical signal may include a voltage outputted from the sub-group SG. In an embodiment, a level of the voltage outputted by the sub-group SG may include a sum and/or average of the voltage levels outputted by each of the pixels PX in the sub-group SG.

More particularly, for example, in the first image data IMG1 of FIG. 8, the first sub-groups SG(1) may show the first color (e.g., the green color). In the first image data IMG1 of FIG. 8, a level G111 of a voltage of a first one of the first sub-groups SG(1) of the first pixel group PG(1) may correspond to a sum of voltage levels G1111, G1112, G1113 and G1114 of four first pixels PX(1) included in the first one of the first sub-groups SG(1). Alternatively or additionally, a level G112 of a voltage of a second one of the first sub-groups SG(1) of the first pixel group PG(1) may correspond to a sum of voltage levels G1121, G1122, G1123 and G1124 of four first pixels PX(1) included in the second one of the first sub-groups SG(1). For another example, a level G211 of a voltage of a first one of the first sub-groups SG(1) of the second pixel group PG(2) may correspond to a sum of voltage levels G2111, G2112, G2113 and G2114 of four first pixels PX(1) included in the first one of the first sub-groups SG(1).

Continuing to refer to the first image data IMG1 of FIG. 8, the second sub-groups SG(2) may show the second color (e.g., the red color). In the first image data IMG1 of FIG. 8, a level R121 of a voltage of a first one of the second sub-groups SG(2) of the first pixel group PG(1) may correspond to a sum of voltage levels R1211, R1212, R1213 and R1214 of four second pixels PX(2) included in the first one of the second sub-groups SG(2).

Continuing to refer to the first image data IMG1 of FIG. 8, the third sub-groups SG(3) may show the third color (e.g., the blue color). In the first image data IMG1 of FIG. 8, a level B231 of a voltage of a first one of the third sub-groups SG(3) of the second pixel group PG(2) may correspond to a sum of voltage levels B2311, B2312, B2313 and B2314 of four third pixels PX(3) included in the first one of the third sub-groups SG(3).

Returning to FIG. 6, the first conversion circuit CC1 may perform the first binning by the method described above to obtain a voltage level from each of the sub-groups SG. In an embodiment, the voltage level may correspond to an analog signal. Alternatively or additionally, the first conversion circuit CC1 may output a digital signal, instead of an analog signal. For example, the digital signal may include a first voltage level showing a low logical value (e.g., '0') and/or a second voltage level showing a high logical value (e.g., '1'). However, the present disclosure is not limited in this regard. For example, the first voltage level may correspond to a high logical level and/or the second voltage level may correspond to a low logical level.

Alternatively or additionally, when an auto-focus function is performed, the sub-group SG may output an electrical signal based on light received into two of the four pixels PX included in the sub-group SG. The two pixels may be adjacent to each other in the first direction X1 and/or the second direction X2.

Referring to FIGS. 6, 8 and 9, the second conversion circuit CC2 may perform a second binning from the first image data IMG1 including data of the first to third colors, thereby obtaining second image data IMG2 including data of the first color, and third image data IMG3 including data of the second and third colors.

A sum (and/or half (½) of the sum) of voltage levels (or digital signals or output levels) of two sub-groups SG adjacent to each other in a diagonal direction (e.g., the third direction X3 and/or the fourth direction X4) in the first image data IMG1 may be used as data of the pixel group PG in the second and third image data IMG2 and IMG3.

For example, the second image data IMG2 of FIG. 9 may include only data on the first color (e.g., the green color) in each of the pixel groups PG. That is, half of a sum (or average) of the voltage levels G111 and G112 of the first sub-groups SG(1) of the first pixel group PG(1) in the first image data IMG1 of FIG. 8 may correspond to a voltage level G1 of the first pixel group PG(1) in the second image data IMG2 of FIG. 9. Alternatively or additionally, half of a sum of voltage levels G211 and G212 of the first sub-groups SG(1) of the second pixel group PG(2) in the first image data IMG1 of FIG. 8 may correspond to a voltage level G2 of the second pixel group PG(2) in the second image data IMG2 of FIG. 9. For another example, half of a sum of voltage levels G311 and G312 of the first sub-groups SG(1) of the third pixel group PG(3) in the first image data IMG1 of FIG. 8 may correspond to a voltage level G3 of the third pixel group PG(3) in the second image data IMG2 of FIG. 9. For yet another example, half of a sum of voltage levels G411 and G412 of the first sub-groups SG(1) of the fourth pixel group PG(4) in the first image data IMG1 of FIG. 8 may correspond to a voltage level G4 of the fourth pixel group PG(4) in the second image data IMG2 of FIG. 9.

In an embodiment, the third image data IMG3 of FIG. 9 may include data on the second color (e.g., the red color) in odd-numbered pixel groups PG(1) and PG(3), and data on the third color (e.g., the blue color) in even-numbered pixel groups PG(2) and PG(4). For example, half of a sum (or average) of voltage levels R121 and R122 of the second sub-groups SG(2) of the first pixel group PG(1) in the first image data IMG1 of FIG. 8 may correspond to a voltage level R1 of the first pixel group PG(1) in the third image data IMG3 of FIG. 9. Alternatively or additionally, half of a sum of voltage levels R321 and R322 of the second sub-groups SG(2) of the third pixel group PG(3) in the first image data IMG1 of FIG. 8 may correspond to a voltage level R3 of the third pixel group PG(3) in the third image data IMG3 of FIG. 9. For another example, half of a sum of voltage levels B231 and B232 of the third sub-groups SG(3) of the second pixel group PG(2) in the first image data IMG1 of FIG. 8 may correspond to a voltage level B2 of the second pixel group PG(2) in the third image data IMG3 of FIG. 9. For yet another example, half of a sum of voltage levels B431 and B432 of the third sub-groups SG(3) of the fourth pixel group PG(4) in the first image data IMG1 of FIG. 8 may correspond to a voltage level B4 of the fourth pixel group PG(4) in the third image data IMG3 of FIG. 9.

Referring to FIGS. 6 and 9, the third conversion circuit CC3 may combine the second and third image data IMG2 and IMG3 with each other to obtain fourth image data IMG4.

In an embodiment, the active pixel sensor array 1001 may have an arrangement similar to the one shown in FIG. 3, and thus a demosaic process may be omitted to prevent noise caused by the demosaic process and/or moire. Alternatively or additionally, the image sensor may be driven by low power through the first binning and the second binning and may obtain an image with improved real resolution (and/or using a modulation transfer function (MTF)) when compared to related image sensors.

For example, a related image sensor may have an arrangement in the form of a Bayer pattern. As such, in a binning operation, data on a green color may be obtained from two of four pixel groups adjacent to each other, data on a red color may be obtained from another one of the four pixel groups, and data on a blue color may be obtained from the other one of the four pixel groups.

However, according to various embodiments of the present disclosure, the image sensor may perform a binning operation in which the data on the green color may be obtained from the four pixel groups PG(1) to PG(4) adjacent to each other, as described above with reference to FIG. 9. Accordingly, the data on the green color, which may be the most sensitive to human eyes, may be sufficiently obtained in order to improve sensitivity. Alternatively or additionally, in the binning operation, the data on the red color may be obtained from two pixel groups (e.g., PG(1) and PG(3)) of the four pixel groups PG(1) to PG(4) adjacent to each other, and the data on the blue color may be obtained from the other two pixel groups (e.g., PG(2) and PG(4)) adjacent thereto. Consequently, the number and/or amount of the data sampled for the red and blue colors in the image sensor may be increased (e.g., doubled) when compared with the related image sensor having the Bayer pattern arrangement. Thereby, image resolution may be improved when compared to the related image sensor.

Figure 10A:
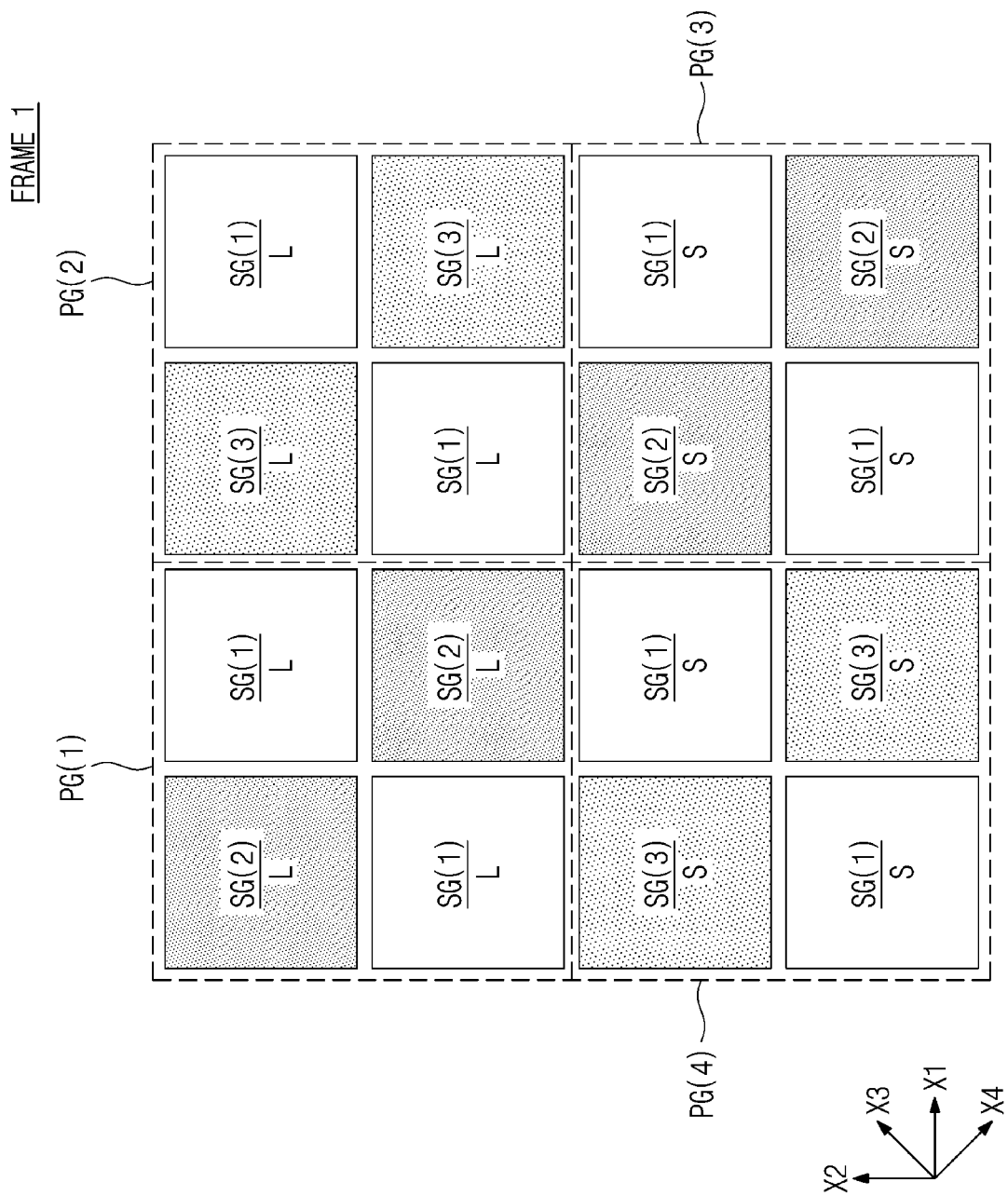
Figure 11A:
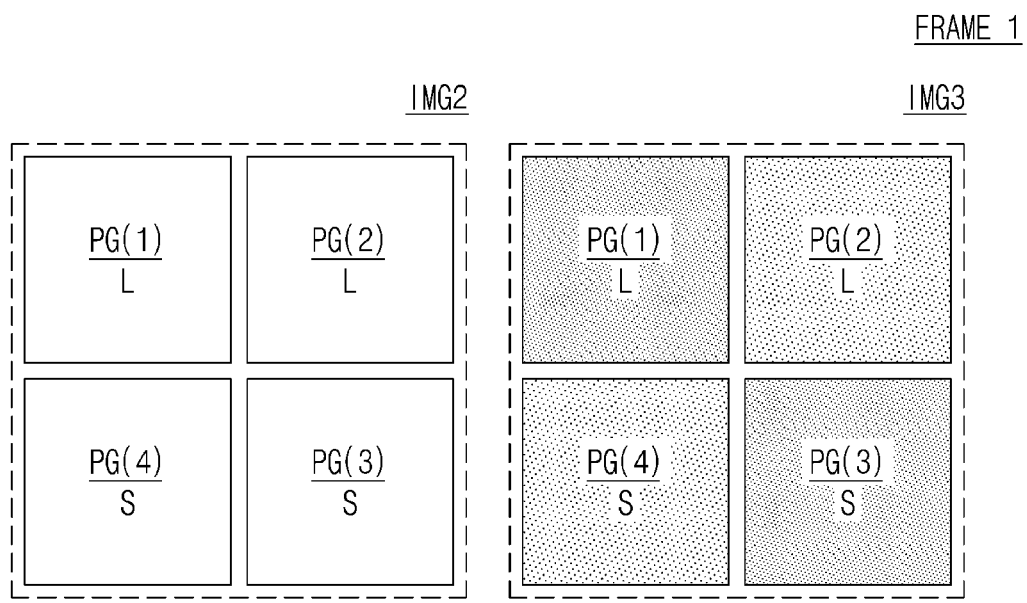
FIGS. 11A and 11B illustrate second and third image data obtained from a second conversion circuit, according to an embodiment.
Figure 11B:
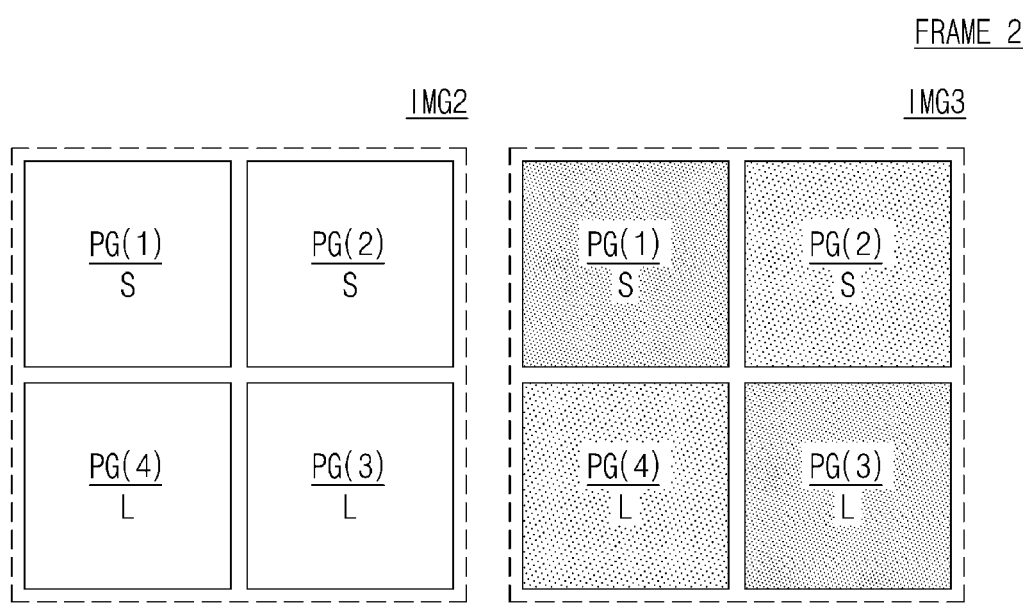

FIGS. 10A and 10B are views illustrating operation states of an image sensor having the active pixel sensor array of FIG. 3, according to an embodiment. FIGS. 11A and 11B illustrate second and third image data obtained from a second conversion circuit, according to an embodiment.

Referring to FIGS. 10A and 11A, in a first frame FRAME 1, an image sensor (e.g., image sensor 1000 having the active pixel sensor array 1001 of FIG. 3) may control the first and second pixel groups PG(1) and PG(2) such that the first and second pixel groups PG(1) and PG(2) may be exposed to light for a first time duration L. Alternatively or additionally, the third and fourth pixel groups PG(3) and PG(4) may be exposed to light for a second time duration S that may be shorter than the first time duration L. In this manner, the pixels PX may generate data from light that may have been exposed using different exposure times in the first frame FRAME 1. Alternatively or additionally, the second and third image data IMG2 and IMG3 of FIG. 11A may be generated using the first and second conversion circuits CC1 and CC2 described with reference to FIG. 6.

Referring to FIGS. 10B and 11B, in a second frame FRAME 2, the image sensor may control the first and second pixel groups PG(1) and PG(2) such that the first and second pixel groups PG(1) and PG(2) may be may be exposed to light for the second time duration S. Alternatively or additionally, the third and fourth pixel groups PG(3) and PG(4) may be exposed to light for the first time duration L. In this manner, the pixels PX may generate data from light that may have been exposed using different exposure times in the second frame FRAME 2. Alternatively or additionally, the second and third image data IMG2 and IMG3 of FIG. 11B may be generated using the first and second conversion circuits CC1 and CC2 described with reference to FIG. 6.

In an embodiment, the second and third image data IMG2 and IMG3 of FIG. 11A and the second and third image data IMG2 and IMG3 of FIG. 11B may be combined with each other to make the fourth image data IMG4 of FIG. 6. Thus, an image having an improved high dynamic range (HDR) and clear image quality may be realized, when compared to a related image sensor.

Figure 12A:
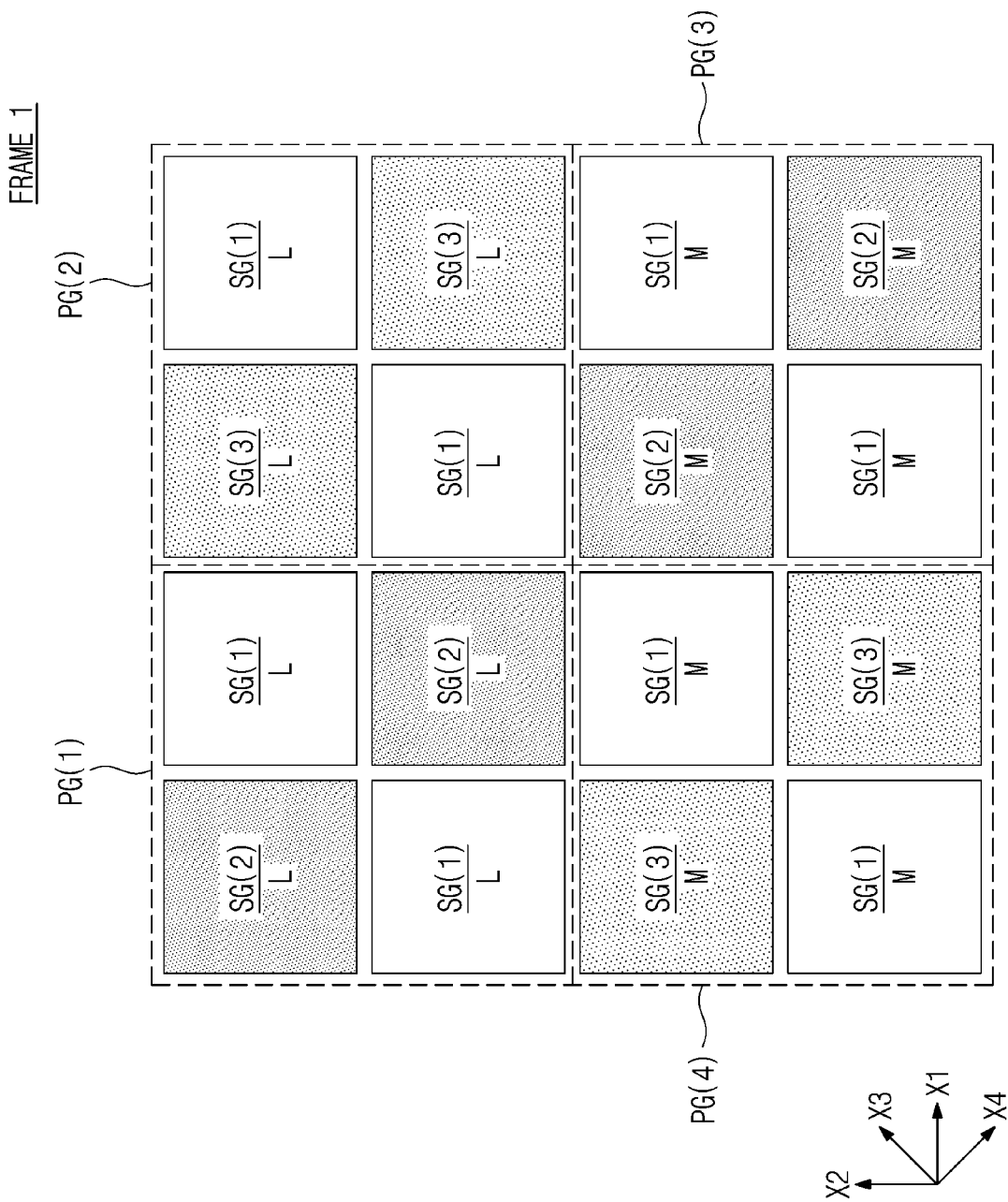
Figure 13A:
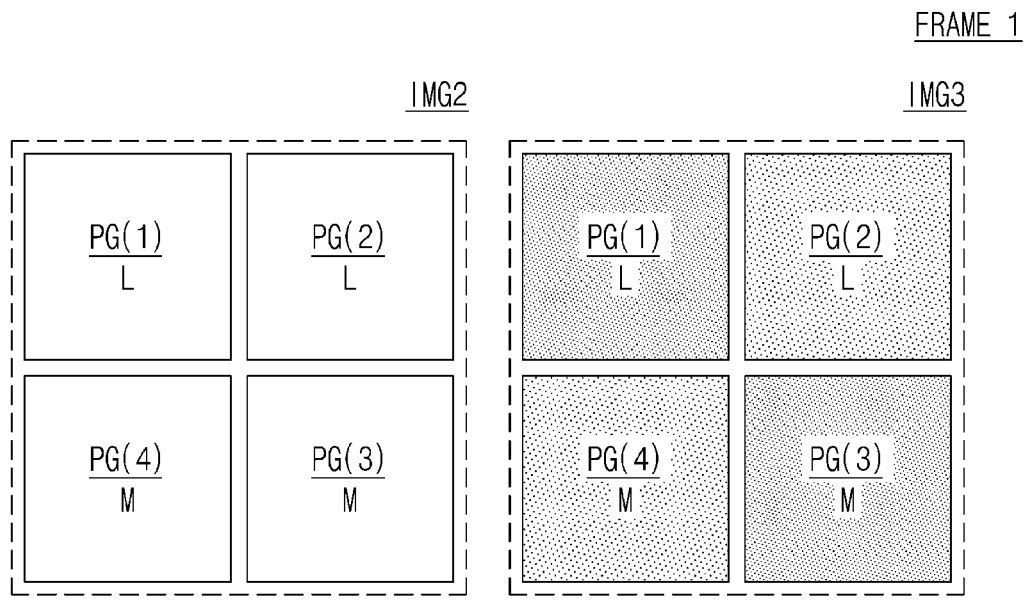
FIGS. 13A and 13B illustrate second and third image data obtained from a second conversion circuit, according to an embodiment.
Figure 13B:
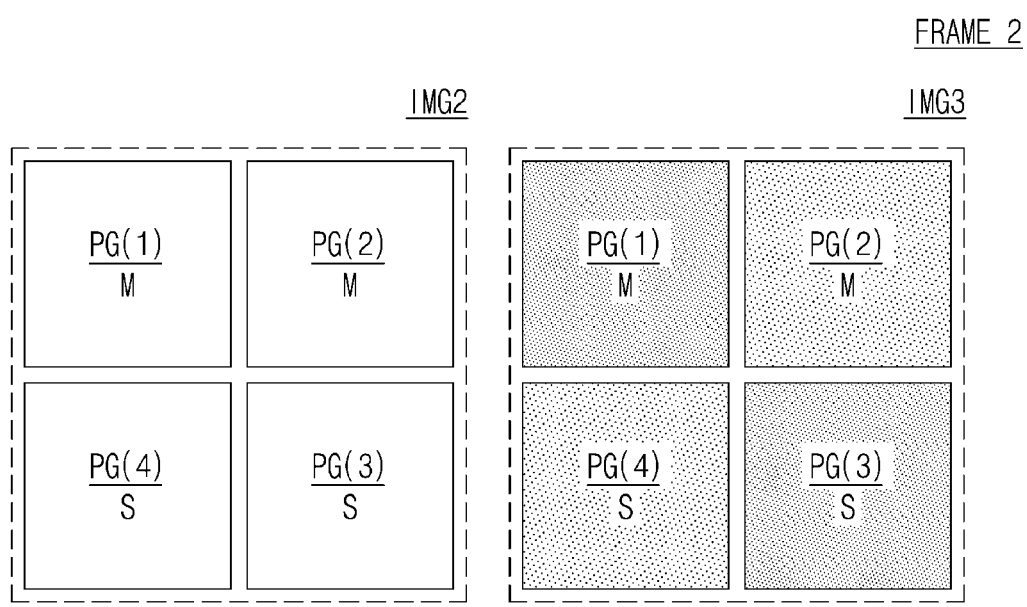

FIGS. 12A and 12B are views illustrating operation states of an image sensor having the active pixel sensor array of FIG. 3, according to an embodiment. FIGS. 13A and 13B illustrate second and third image data obtained from a second conversion circuit, according to.

Referring to FIGS. 12A and 13A, in a first frame FRAME 1, the image sensor (e.g., image sensor 1000 having the active pixel sensor array 1001 of FIG. 3) may control the first and second pixel groups PG(1) and PG(2) such that the first and second pixel groups PG(1) and PG(2) may be exposed to light for the first time duration L. Alternatively or additionally, the third and fourth pixel groups PG(3) and PG(4) may be exposed to light for a third time duration M, which may be shorter than the first time duration L. In this manner, the pixels PX may generate data from light that may have been exposed using different exposure times in the first frame FRAME 1. Alternatively or additionally, the second and third image data IMG2 and IMG3 of FIG. 13A may be generated using the first and second conversion circuits CC1 and CC2 described with reference to FIG. 6.

Referring to FIGS. 12B and 13B, in a second frame FRAME 2, the image sensor may control the first and second pixel groups PG(1) and PG(2) such that the first and second pixel groups PG(1) and PG(2) may be exposed to light for the third time duration M. Alternatively or additionally, the third and fourth pixel groups PG(3) and PG(4) may be exposed to light for the second time duration S, which may be shorter than the third time duration M. In this manner, the pixels PX may generate data from light that may have been exposed using different exposure times in the second frame FRAME 2. Alternatively or additionally, the second and third image data IMG2 and IMG3 of FIG. 13B may be generated using the first and second conversion circuits CC1 and CC2 described with reference to FIG. 6.

In an embodiment, the second and third image data IMG2 and IMG3 of FIG. 13A and the second and third image data IMG2 and IMG3 of FIG. 13B may be combined with each other to make the fourth image data IMG4 of FIG. 6. Thus, an image having an improved HDR and clear image quality may be realized, when compared to a related image sensor.

Figure 14:
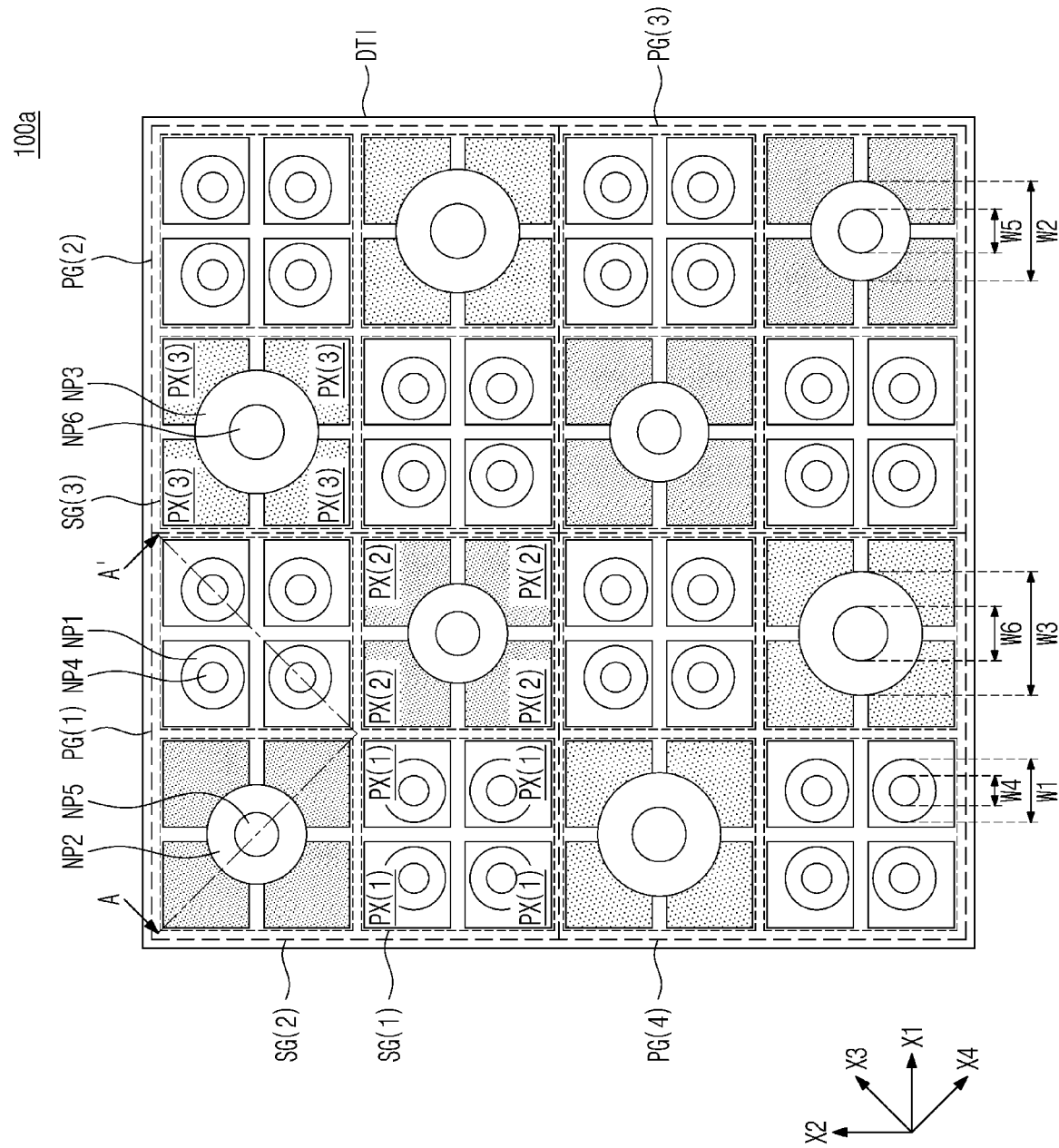
FIG. 14 is a plan view illustrating an image sensor, according to an embodiment.
Figure 15:
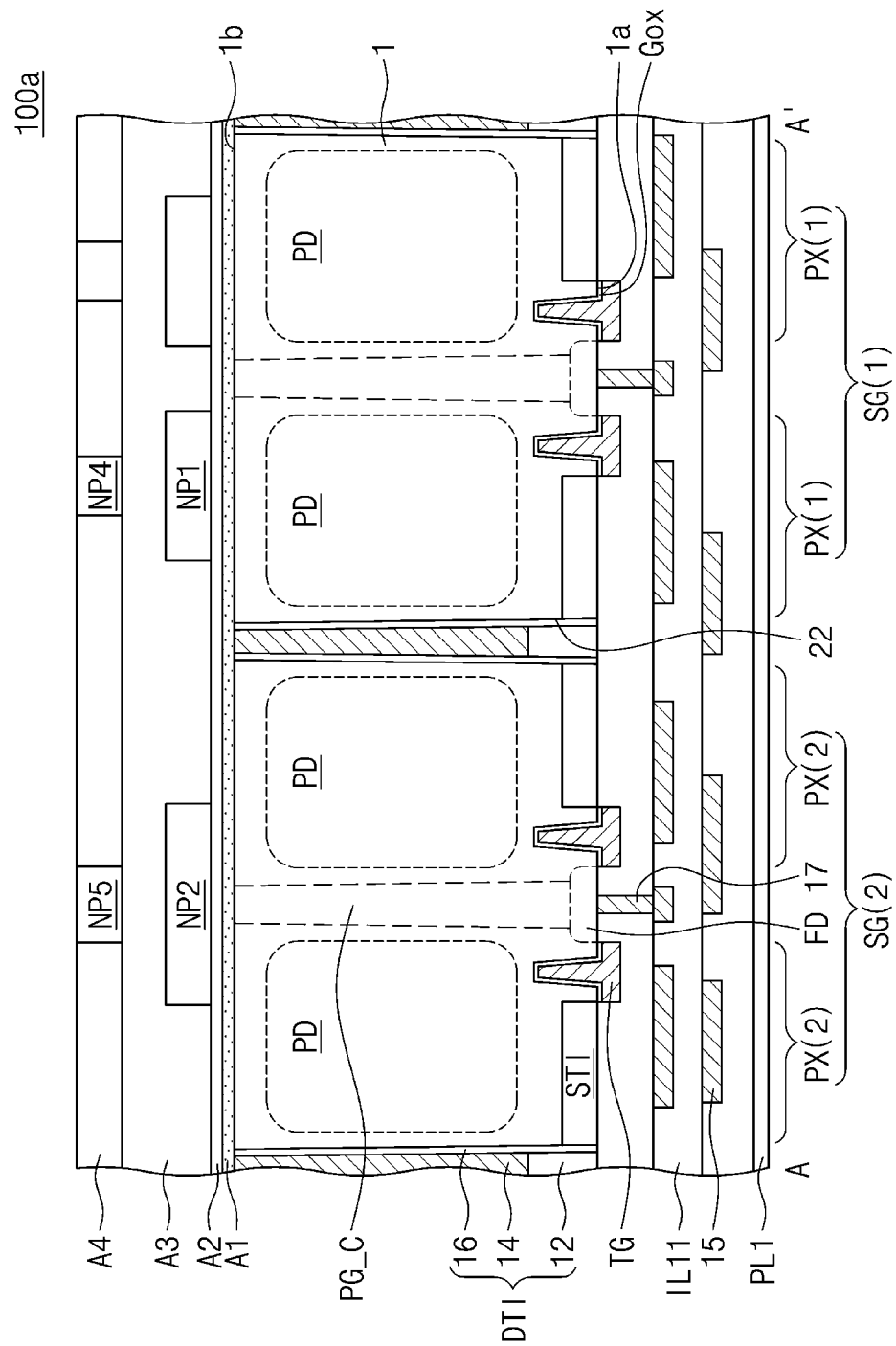
FIG. 15 is a cross-sectional view taken along a line A-A' of FIG. 14, according to an embodiment.

FIG. 14 is a plan view illustrating an image sensor, according to an embodiment. FIG. 15 is a cross-sectional view taken along a line A-A' of FIG. 14. An image sensor 100a of FIGS. 14 and 15 may include or may be similar in many respects to at least one of the image sensor 1000 and the image sensor 100 described above with reference to FIGS. 1 to 5, and may include additional features not mentioned above.

Referring to FIGS. 14 and 15, in the image sensor 100a may include first to sixth high-refractive patterns (e.g., first high-refractive pattern NP1, second high-refractive pattern NP2, third high-refractive pattern NP3, fourth high-refractive pattern NP4, fifth high-refractive pattern, and NP6 high-refractive pattern), a first planarization layer A3, and a second planarization layer A4. In an embodiment, the image sensor 100a may dispose the first to sixth high-refractive patterns NP1 to NP6 and the first and second planarization layers A3 and A4 on the anti-reflection layer A2 instead of the color filters CF1, CF2 and CF3 and the micro lenses ML, as described above with reference to FIGS. 4A and 5. In an optional or additional embodiment, the first to sixth high-refractive patterns NP1 to NP6 may be formed of a material having a refractive index higher than the refractive index of the first and second planarization layers A3 and A4. For example, the first and second planarization layers A3 and A4 may be formed of silicon oxide (SiO), and each of the first to sixth high-refractive patterns NP1 to NP6 may have a single-layered and/or multi-layered structure including at least one of titanium oxide (TiO) and silicon nitride (SiN).

In an embodiment, each of the first to sixth high-refractive patterns NP1 to NP6 may have a circular shape when viewed in a plan view. For example, the first high-refractive patterns NP1 may overlap the first pixels PX(1) of the first sub-groups SG(1), respectively. Alternatively or additionally, the second high-refractive patterns NP2 may overlap centers of the second sub-groups SG(2), respectively. For another example, each of the second high-refractive patterns NP2 may overlap the four second pixels PX(2) included in each of the second sub-groups SG(2). For another example, the third high-refractive patterns NP3 may overlap centers of the third sub-groups SG(3), respectively. For another example, each of the third high-refractive patterns NP3 may overlap the four third pixels PX(3) included in each of the third sub-groups SG(3).

In an embodiment, at least a portion of the first to third high-refractive patterns NP1 to NP3 may be covered with the first planarization layer A3. The fourth to sixth high-refractive patterns NP4 to NP6 may be disposed on the first planarization layer A3. The fourth high-refractive patterns NP4 may overlap the first high-refractive patterns NP1, respectively. Alternatively or additionally, the fourth high-refractive patterns NP4 may be disposed on the first pixels PX(1). The fifth high-refractive patterns NP5 may overlap the second high-refractive patterns NP2, respectively. Alternatively or additionally, the fifth high-refractive patterns NP5 may overlap the centers of the second sub-groups SG(2), respectively. The sixth high-refractive patterns NP6 may overlap the third high-refractive patterns NP3, respectively. Alternatively or additionally, the sixth high-refractive patterns NP6 may overlap the centers of the third sub-groups SG(3), respectively.

The first high-refractive pattern NP1 may have a first width W1. The second high-refractive pattern NP2 may have a second width W2. The third high-refractive pattern NP3 may have a third width W3. The fourth high-refractive pattern NP4 may have a fourth width W4. The fifth high-refractive pattern NP5 may have a fifth width W5. The sixth high-refractive pattern NP6 may have a sixth width W6. In an embodiment, the first to sixth widths W1 to W6 may be different from each other. Alternatively or additionally, some of the first to sixth widths W1 to W6 may be substantially similar and/or equal to each other. In an embodiment, the first width W1 may be greater (e.g., wider) than the fourth width W4. Alternatively or additionally, the second width W2 may be greater (e.g., wider) than the fifth width W5. In an optional or additional embodiment, the third width W3 may be greater (e.g., wider) than the sixth width W6.

Due to the first to sixth high-refractive patterns NP1 to NP6 having a difference in refractive index from a surrounding material, light passing through the first to sixth high-refractive patterns NP1 to NP6 may change phase. That is, the light may change phase as the light passes through the first to sixth high-refractive patterns NP1 to NP6. The phase change may be result from a phase delay generated by a shape dimension of a sub-wavelength of the first to sixth high-refractive patterns NP1 to NP6. As such, the phase delay may be determined based on detailed shape dimensions and/or an arrangement shape of the first to sixth high-refractive patterns NP1 to NP6. In an embodiment, a phase delay generated in each of the first to sixth high-refractive patterns NP1 to NP6 may be appropriately set to obtain at least one of various optical functions. For example, the first to sixth high-refractive patterns NP1 to NP6 may adjust a phase distribution of light to multi-focus light of the same wavelength on a predetermined target region.

The planar shape of each of the first to third high-refractive patterns NP1 to NP3 may not limited to the circular shape but may have at least one of other various shapes such as a, but not limited to, tetragonal shape, a triangular shape and a polygonal shape. Alternatively or additionally, the first to third high-refractive patterns NP1 to NP3 may have at least one of various three-dimensional shapes such as, but not limited to, a circular pillar shape, a cone shape, a quadrangular pyramid shape, a trigonal pyramid shape, a polygonal pyramid shape, and a rectangular parallelepiped shape. Furthermore, the arrangement of the first to third high-refractive patterns NP1 to NP3 is not limited to the embodiments described above but may be variously modified.

Figure 16A:
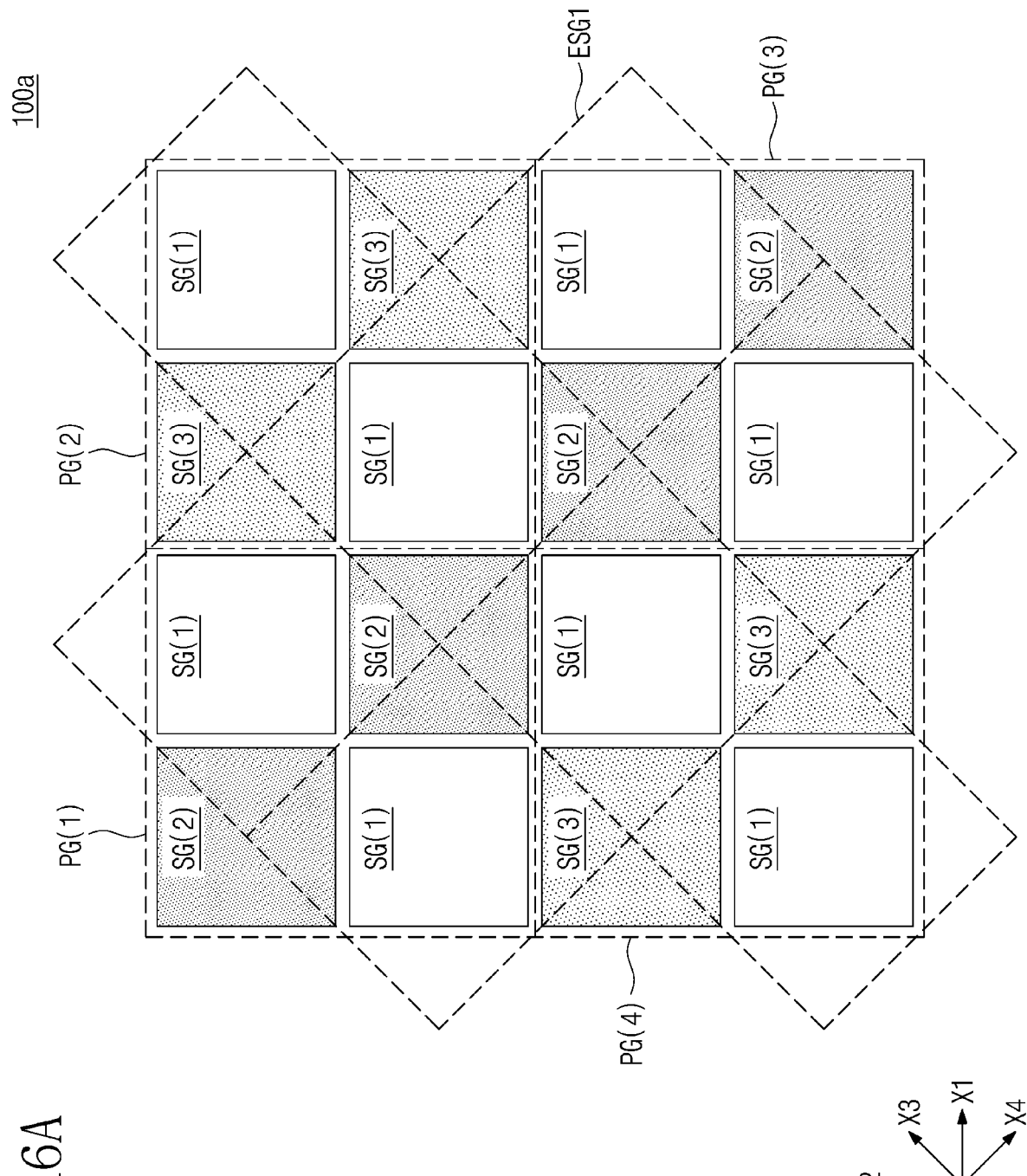
FIGS. 16A to 16C illustrate effective light receiving regions in an image sensor, according to an embodiment.
Figure 16B:
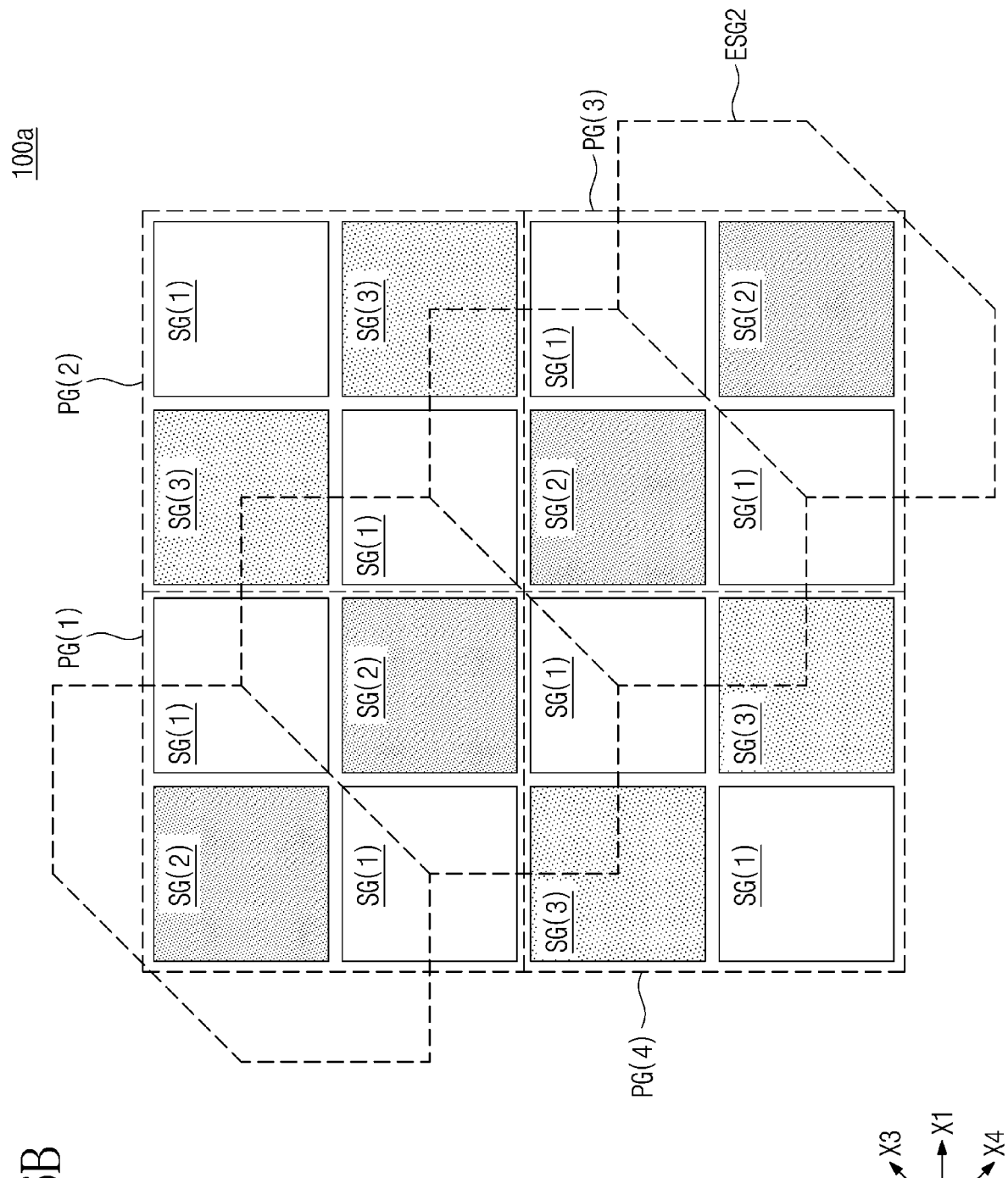
Figure 16C:
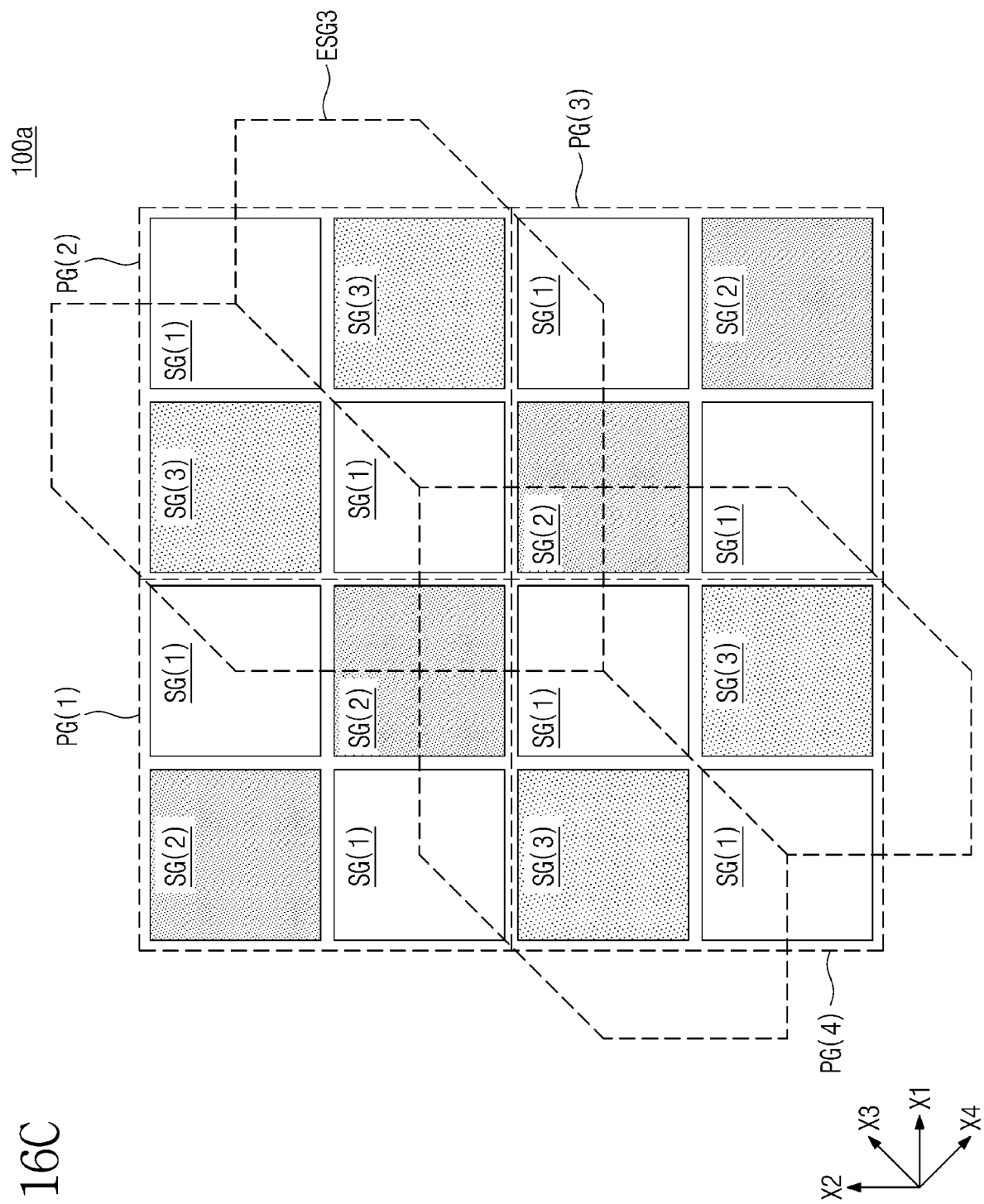

FIGS. 16A to 16C illustrate effective light receiving regions in an image sensor, according to an embodiment.

For example, the first and fourth high-refractive patterns NP1 and NP4 may concentrate light of the first color (e.g., the green color) on the first pixels PX(1) of the first sub-group SG(1). Referring to FIG. 16A, a planar area of an effective light receiving region ESG1 of the light of the first color may be greater than a planar area of the first sub-group SG(1) by the first and fourth high-refractive patterns NP1 and NP4.

In an embodiment, the second and fifth high-refractive patterns NP2 and NP5 may concentrate light of the second color (e.g., the red color) on the second pixels PX(2) of the second sub-group SG(2). Referring to FIG. 16B, a planar area of an effective light receiving region ESG2 of the light of the second color may be greater than a planar area of the second sub-group SG(2) by the second and fifth high-refractive patterns NP2 and NP5.

In an optional or additional embodiment, the third and sixth high-refractive patterns NP3 and NP6 may concentrate light of the third color (e.g., the blue color) on the third pixels PX(3) of the third sub-group SG(3). Referring to FIG. 16C, a planar area of an effective light receiving region ESG3 of the light of the third color may be greater than a planar area of the third sub-group SG(3) by the third and sixth high-refractive patterns NP3 and NP6.

As such, the image sensor 100a may concentrate light of a desired wavelength on a desired region by using the first to sixth high-refractive patterns NP1 to NP6 without the color filters CF1, CF2 and CF3 and may efficiently concentrate the light without the micro lenses ML. Alternatively or additionally, the planar area of the effective light receiving region may be increased as described above. Thus, photosensitivity of the image sensor 100a may be improved, when compared to related image sensors.

Figure 17A:
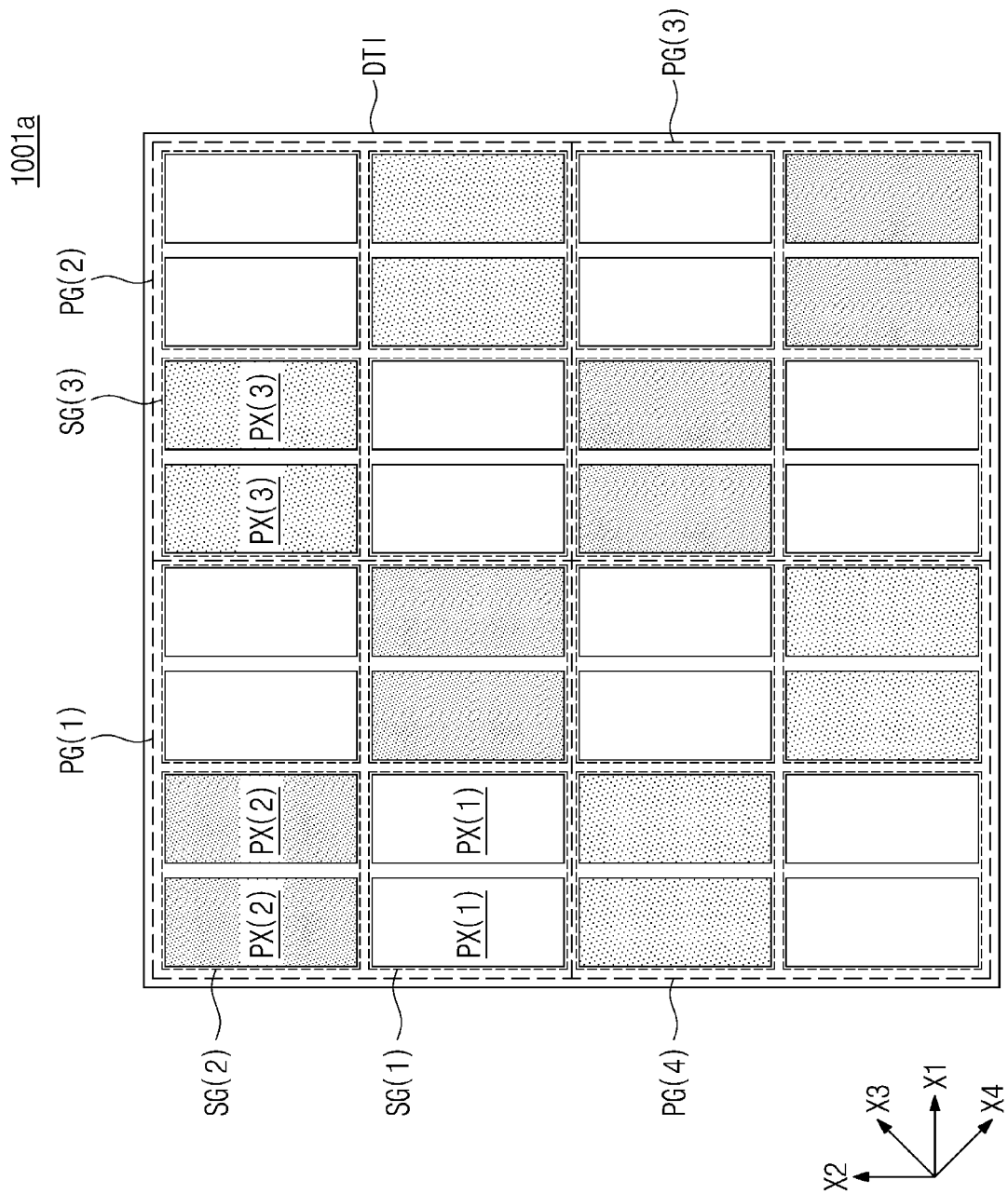
FIGS. 17A and 17B are plan views illustrating active pixel sensor arrays of image sensors, according to an embodiment.
Figure 17B:
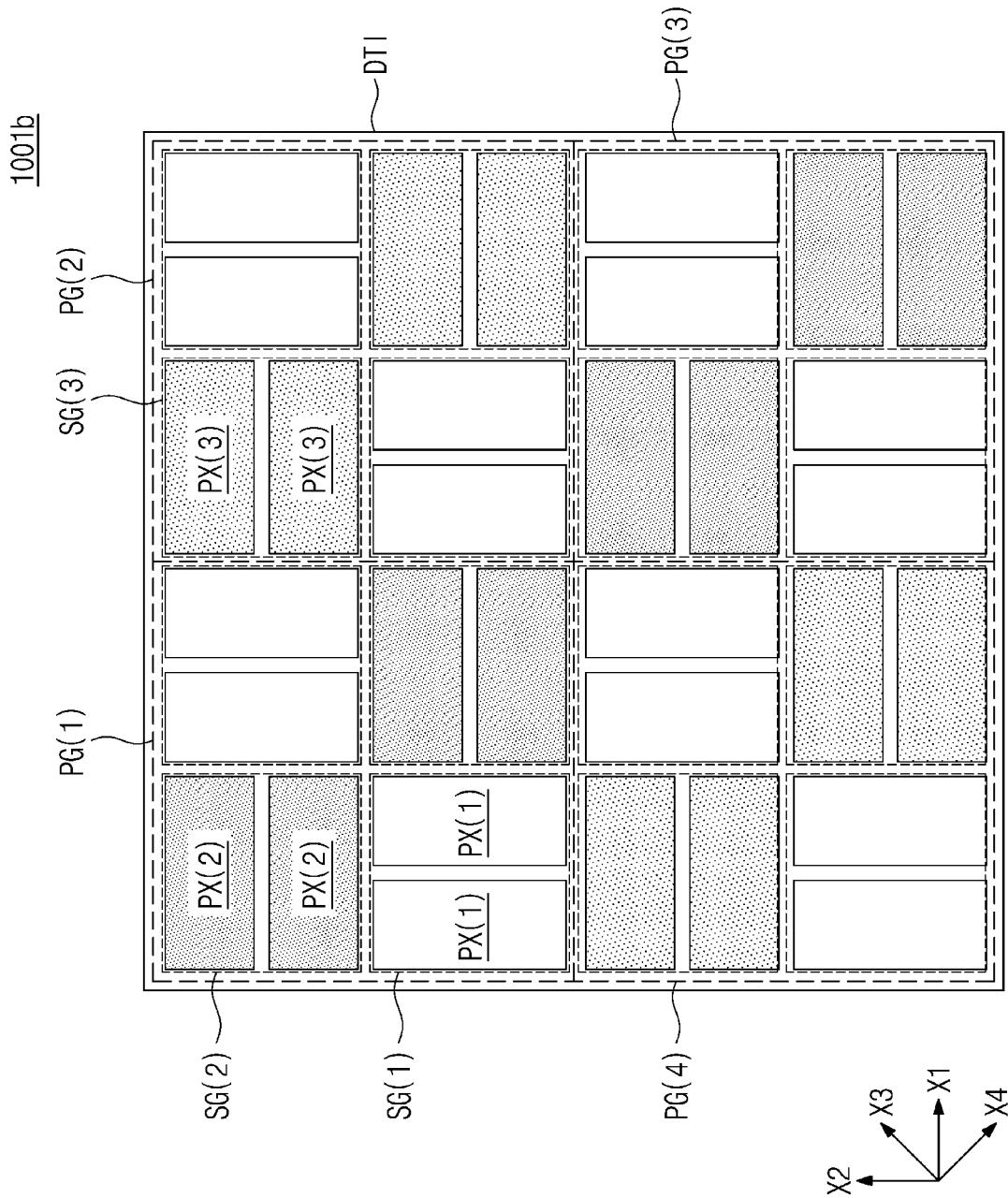

FIGS. 17A and 17B are plan views illustrating active pixel sensor arrays of image sensors, according to an embodiment.

Referring to FIG. 17A, in an active pixel sensor array 1001a according to the present embodiments, each of sub-groups SG may include two pixels PX. Each of the pixels PX of the sub-groups SG may have a bar shape extending in the second direction X2. In some embodiments, the active pixel sensor array 1001a may be used in an auto-focus image sensor. The active pixel sensor array 1001*a* may include or may be similar in many respects to the active pixel sensor array 1001 described above with reference to FIG. 3, and may include additional features not mentioned above.

Referring to FIG. 17B, in an active pixel sensor array 1001*b* according to the present embodiments, each of sub-groups SG may include two pixels PX. Each of first pixels PX(1) included in the first sub-group SG(1) may have a bar shape extending in the second direction X2. Each of second pixels PX(2) included in the second sub-group SG(2) may have a bar shape extending in the first direction X1. Each of third pixels PX(3) included in the third sub-group SG(3) may have a bar shape extending in the first direction X1. The active pixel sensor array 1001*b* may include or may be similar in many respects to the active pixel sensor array 1001 described above with reference to FIG. 3, and may include additional features not mentioned above.

Figure 18:
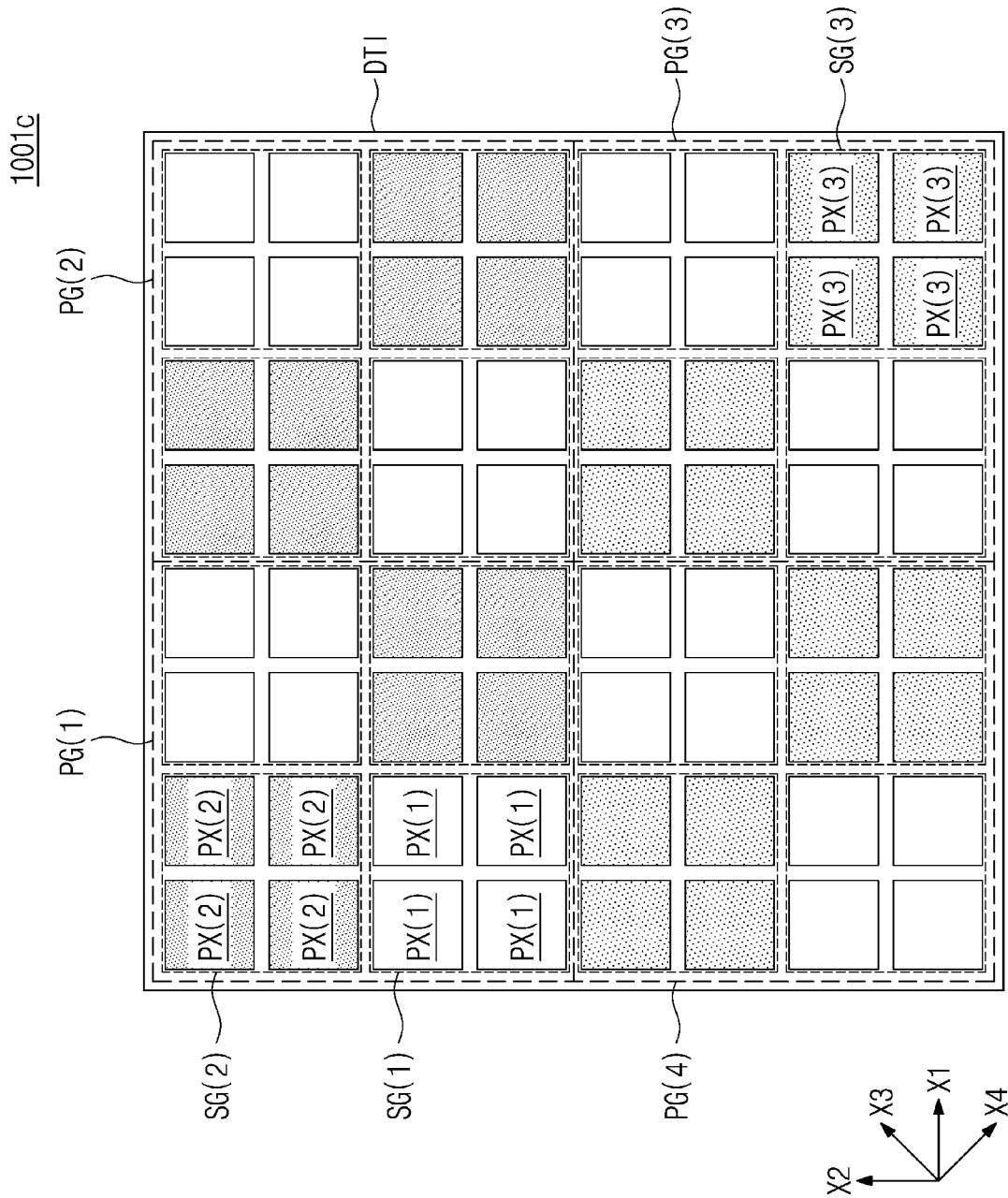
FIG. 18 is a plan view illustrating an active pixel sensor array of an image sensor, according to an embodiment.

FIG. 18 is a plan view illustrating an active pixel sensor array of an image sensor, according to an embodiment.

Referring to FIG. 18, in an active pixel sensor array 1001*c* according to the present embodiments, each of first and second pixel groups PG(1) and PG(2) may include first and second sub-groups SG(1) and SG(2) arranged in two rows and two columns. Each of the first sub-groups SG(1) may include first pixels PX(1) which may be used to sense first light and are arranged in two rows and two columns. Each of the second sub-groups SG(2) may include second pixels PX(2) which may be used to sense second light and are arranged in two rows and two columns. For example, the first light may be light of a green wavelength. For another example, the second light may be light of a red wavelength. In each of the first and second pixel groups PG(1) and PG(2), the first sub-groups SG(1) may be arranged in the third direction X3. The second sub-groups SG(2) may be arranged in the fourth direction X4.

Each of fourth and third pixel groups PG(4) and PG(3) of the active pixel sensor array 1001*c* may include first and third sub-groups SG(1) and SG(3) arranged in two rows and two columns. Alternatively or additionally, each of the third sub-groups SG(3) may include third pixels PX(3) which may be used to sense third light and are arranged in two rows and two columns. For example, the third light may be light of a blue wavelength. In each of the fourth and third pixel groups PG(4) and PG(3), the first sub-groups SG(1) may be arranged in the third direction X3. The third sub-groups SG(3) may be arranged in the fourth direction X4. The active pixel sensor array 1001*c* may include or may be similar in many respects to the active pixel sensor array 1001 described above with reference to FIG. 3, and may include additional features not mentioned above.

Figure 19B:
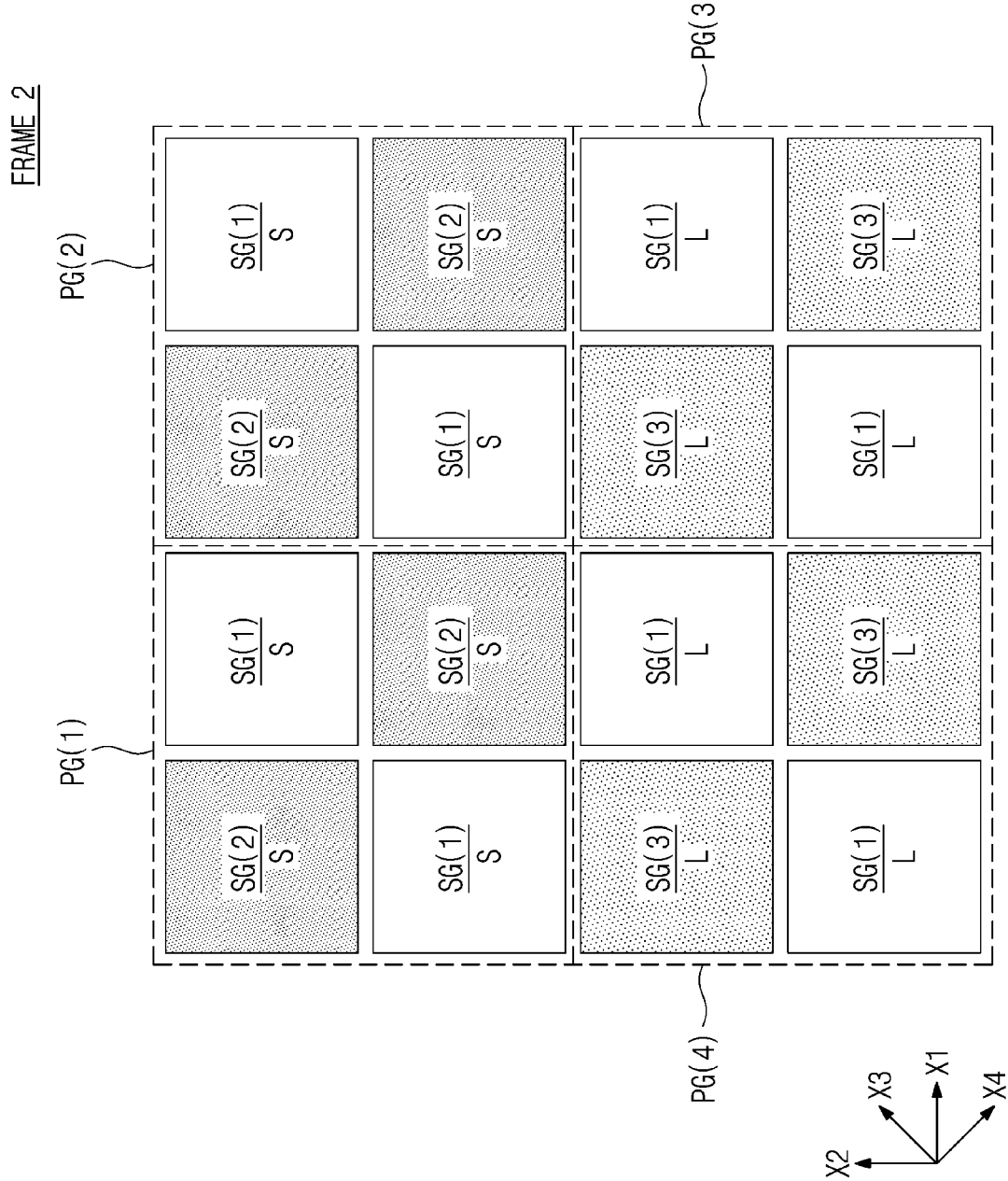
Figure 20A:
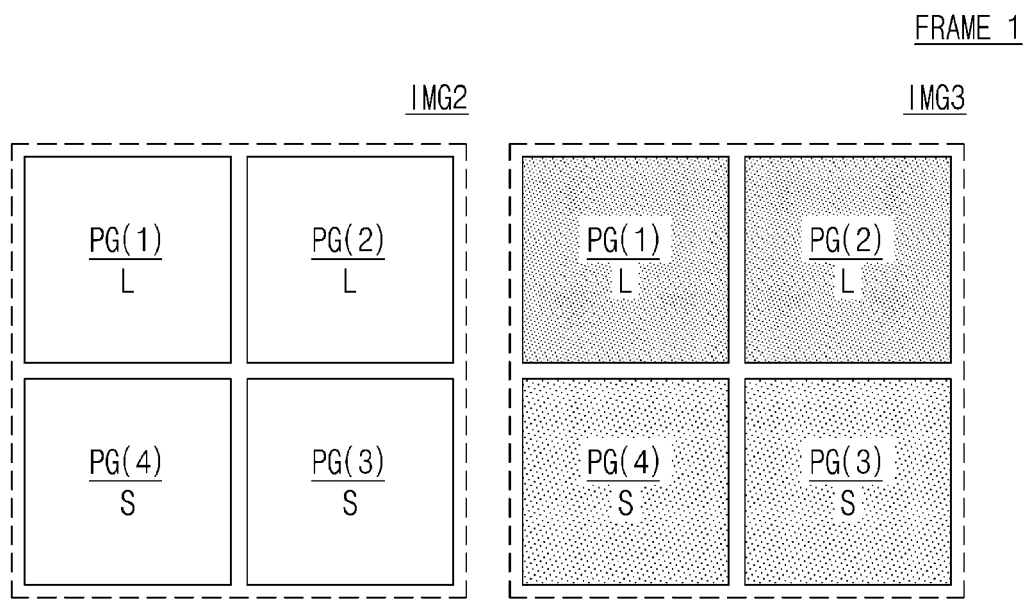
FIGS. 20A and 20B illustrate second and third image data obtained from a second conversion circuit, according to an embodiment.
Figure 20B:
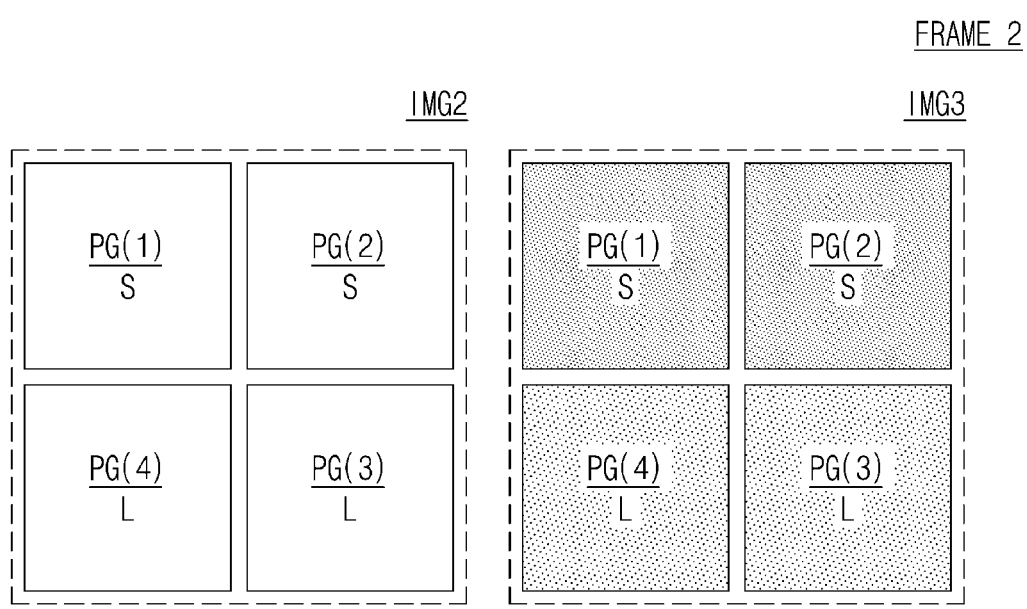

FIGS. 19A and 19B are views illustrating operation states of an image sensor having the active pixel sensor array of FIG. 18, according to an embodiment. FIGS. 20A and 20B illustrate second and third image data obtained from a second conversion circuit, according to an embodiment.

Referring to FIGS. 19A and 20A, in a first frame FRAME 1, an image sensor (e.g., an image sensor having the active pixel sensor array 1001*c* of FIG. 18) may control the first and second pixel groups PG(1) and PG(2) such that the first and second pixel groups PG(1) and PG(2) may be exposed to light for a first time duration L. Alternatively or additionally, the third and fourth pixel groups PG(3) and PG(4) may be exposed to light for a second time duration S, which may be shorter than the first time duration L. In this manner, the pixels PX may generate data from light that may have been exposed using different exposure times in the first frame FRAME 1. Alternatively or additionally, the second and third image data IMG2 and IMG3 of FIG. 20A may be generated using the first and second conversion circuits CC1 and CC2 described with reference to FIG. 6.

Referring to FIGS. 19B and 20B, in a second frame FRAME 2, the image sensor may control the first and second pixel groups PG(1) and PG(2) such that the first and second pixel groups PG(1) and PG(2) may be may be exposed to light for the second time duration S. Alternatively or additionally, the third and fourth pixel groups PG(3) and PG(4) may be exposed to light for the first time duration L. In this manner, the pixels PX may generate data from light that may have been exposed using different exposure times in the second frame FRAME 2. Alternatively or additionally, the second and third image data IMG2 and IMG3 of FIG. 20B may be generated using the first and second conversion circuits CC1 and CC2 described with reference to FIG. 6.

In an embodiment the second and third image data IMG2 and IMG3 of FIG. 20A and the second and third image data IMG2 and IMG3 of FIG. 20B may be combined with each other to obtain the fourth image data IMG4 of FIG. 6. Thus, an image having an improved HDR and clear image quality may be realized when compared to related image sensors.

Figure 21A:
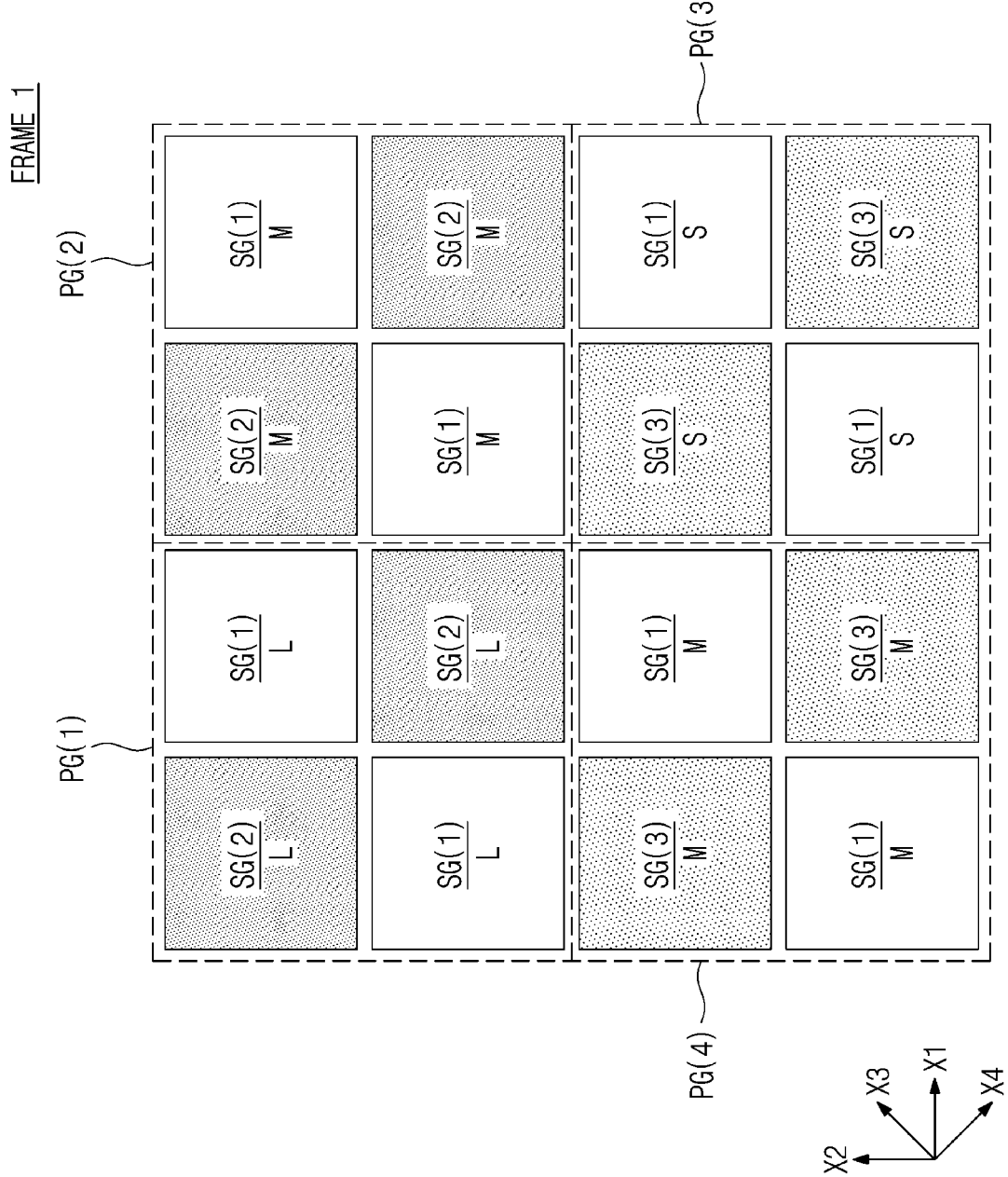
FIGS. 21A and 21B are views illustrating operation states of an image sensor having the active pixel sensor array of FIG. 18, according to an embodiment.
Figure 21B:
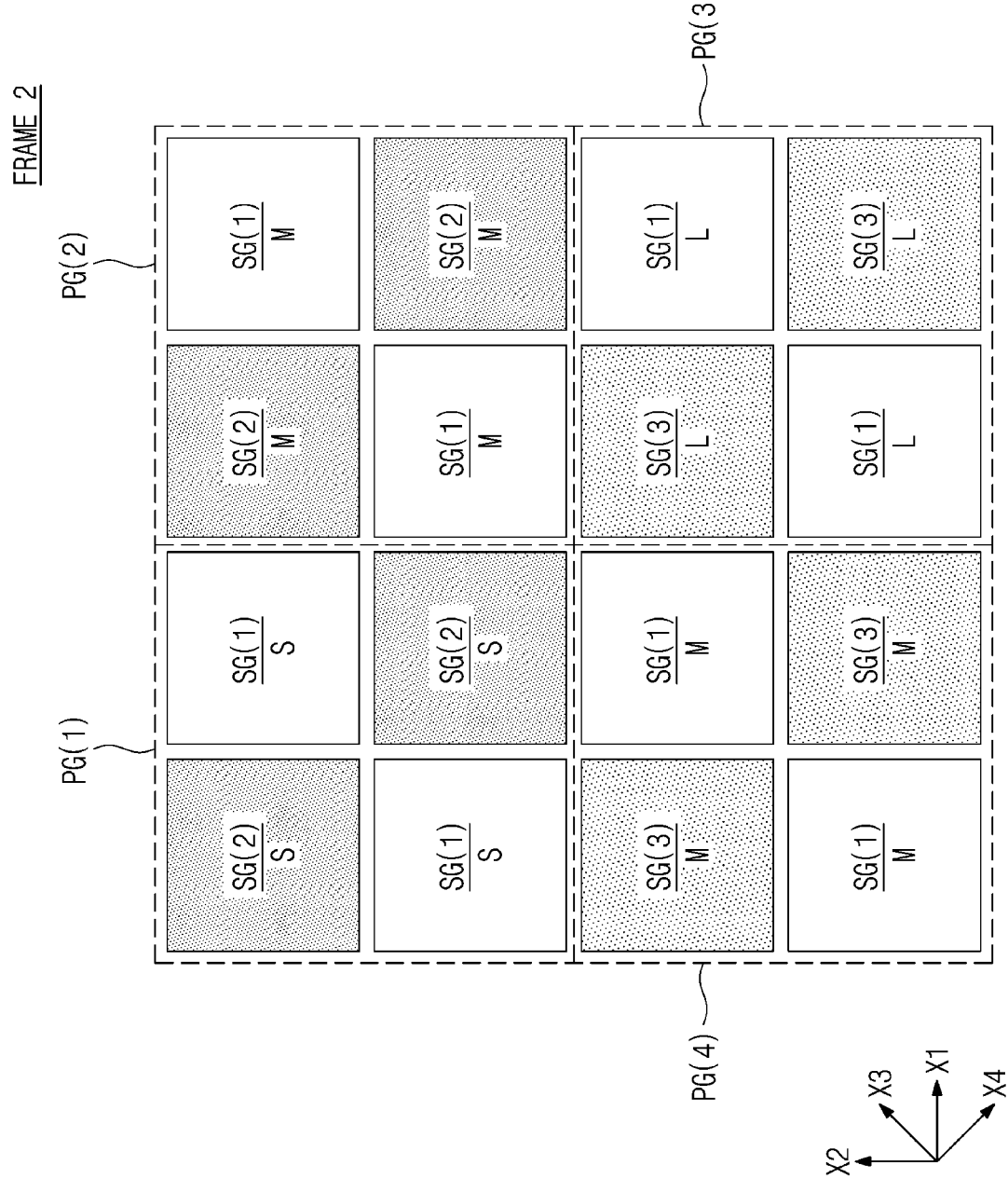
Figure 22A:
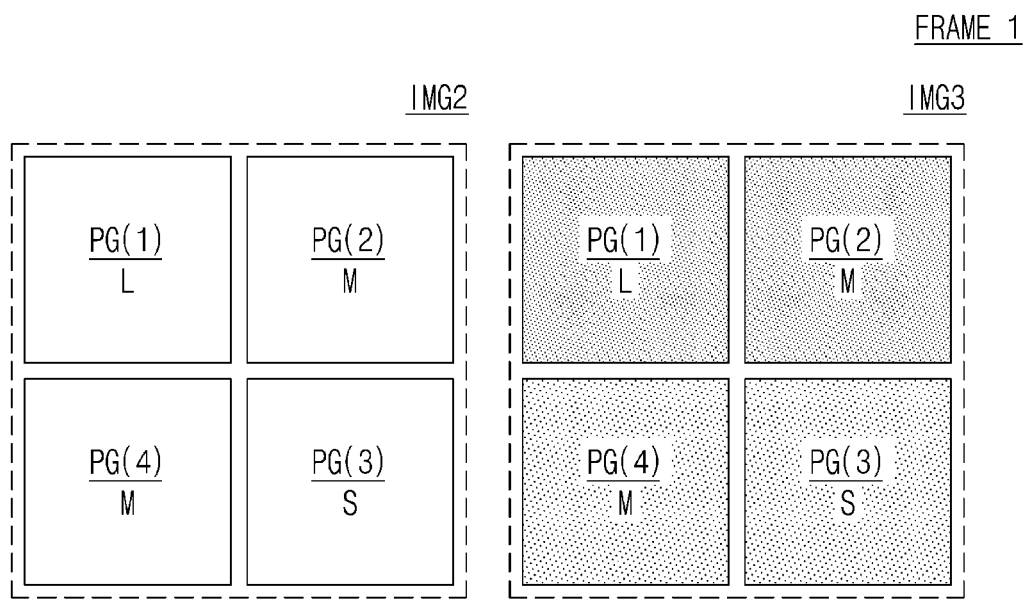
FIGS. 22A and 22B illustrate second and third image data obtained from a second conversion circuit, according to an embodiment.
Figure 22B:
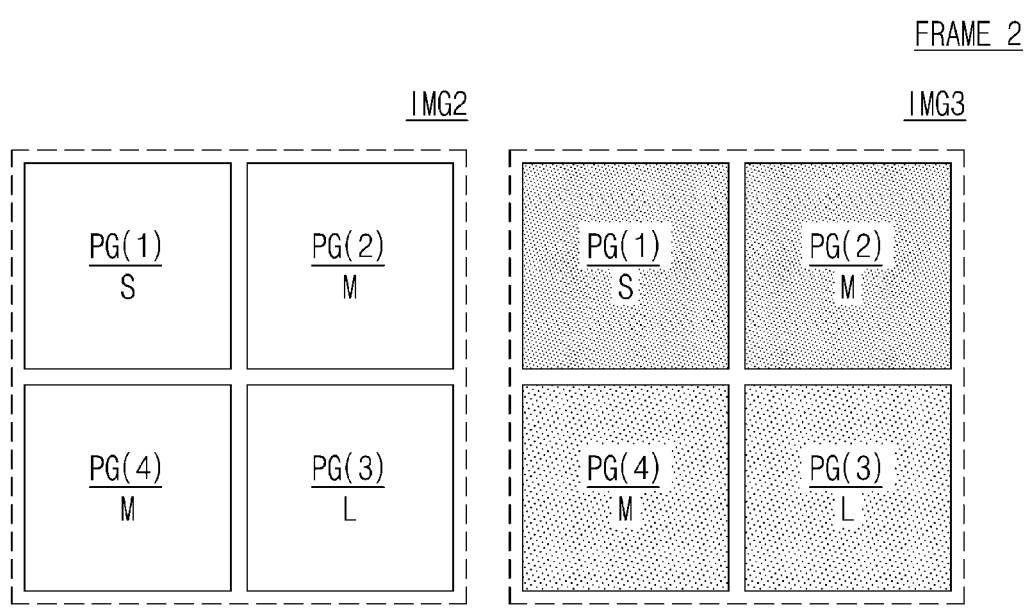

FIGS. 21A and 21B are views illustrating operation states of an image sensor having the active pixel sensor array of FIG. 18, according to an embodiment. FIGS. 22A and 22B illustrate second and third image data obtained from a second conversion circuit, according to an embodiment.

Referring to FIGS. 21A and 22A, in a first frame FRAME 1, an image sensor (e.g., an image sensor having the active pixel sensor array 1001*c* of FIG. 18) may control the first pixel group PG(1) such that the first pixel group PG(1) may be exposed to light for the first time duration L. Alternatively or additionally, the third pixel group PG(3) may be exposed to light for the second time duration S, which may be shorter than the first time duration L. The second and fourth pixel groups PG(2) and PG(4) may be exposed to light for a third time duration M. In an embodiment, the third time duration M may be shorter than the first time duration L and/or may be longer than the second time duration S. In this manner, the pixels PX may generate data from light that may have been exposed using different exposure times in the first frame FRAME 1. Alternatively or additionally, the second and third image data IMG2 and IMG3 of FIG. 22A may be generated using the first and second conversion circuits CC1 and CC2 described with reference to FIG. 6.

Referring to FIGS. 21B and 22B, in a second frame FRAME 2, the image sensor may control the first pixel group PG(1) such that the first pixel group PG(1) may be exposed to light for the second time duration S. Alternatively or additionally, the third pixel group PG(3) may be exposed to light for the first time duration L. The second and fourth pixel groups PG(2) and PG(4) may be exposed to light for the third time duration M. In this manner, the pixels PX may generate data from light that may have been exposed using different exposure times in the second frame FRAME 2. Alternatively or additionally, the second and third image data IMG2 and IMG3 of FIG. 22B may be generated using the first and second conversion circuits CC1 and CC2 described with reference to FIG. 6.

In an embodiment, the second and third image data IMG2 and IMG3 of FIG. 22A and the second and third image data IMG2 and IMG3 of FIG. 22B may be combined with each other to obtain the fourth image data IMG4 of FIG. 6. Thus, an image having an improved HDR and clear image quality may be realized, when compared to related image sensors.

Figure 23:
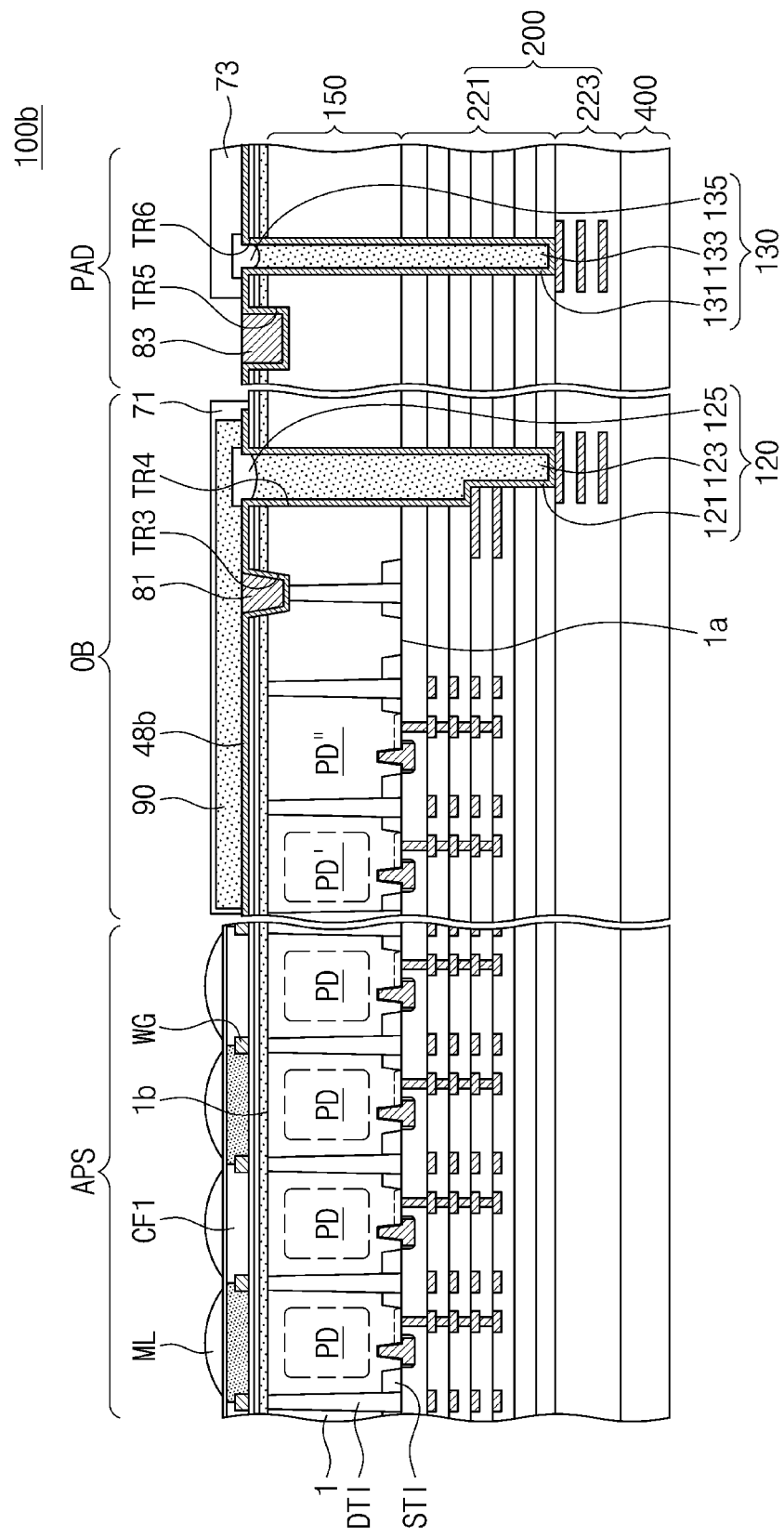
FIG. 23 is a cross-sectional view illustrating an image sensor, according to an embodiment.

FIG. 23 is a cross-sectional view illustrating an image sensor, according to an embodiment.

Referring to FIG. 23, an image sensor 100b may include a first substrate 1 having a pixel array region APS, an optical black region OB and a pad region PAD, an interconnection layer 200 on a front surface 1a of the first substrate 1, and a second substrate 400 on the interconnection layer 200. The interconnection layer 200 may include an upper interconnection layer 221 and a lower interconnection layer 223. The pixel array region APS may include a plurality of pixels PX. The pixels PX disposed in the pixel array region APS may be substantially the same as the pixels PX described above with reference to FIGS. 3 to 22B.

In the optical black region OB, a light blocking pattern 48b, a first connection structure 120, a first conductive pad 81 and a bulk color filter 90 may be provided on the first substrate 1. The first connection structure 120 may include a first connection line 121, an insulating pattern 123, and a first capping pattern 125.

A portion of the first connection line 121 may be provided on a back surface 1b of the first substrate 1. The light blocking pattern 48b may cover at least a portion of the back surface 1b and/or may conformally cover at least a portion of inner surfaces of a third trench TR3 and a fourth trench TR4. The first connection line 121 may penetrate a photoelectric conversion layer 150 and the upper interconnection layer 221 to connect the photoelectric conversion layer 150 and the interconnection layer 200. That is, the first connection line 121 may be in contact with interconnection lines in the upper interconnection layer 221 and the lower interconnection layer 223 and the isolation conductive pattern 14 of the pixel isolation portion DTI in the photoelectric conversion layer 150. Thus, the first connection structure 120 may be electrically connected to the interconnection lines in the interconnection layer 200. The first connection line 121 may include a metal material (e.g., tungsten (W)). The light blocking pattern 48b may block light incident to the optical black region OB.

The first conductive pad 81 may be provided in the third trench TR3 to fill a remaining portion of the third trench TR3. The first conductive pad 81 may include a metal material (e.g., aluminum (Al)). The first conductive pad 81 may be connected to the isolation conductive pattern 14 of FIG. 5. In an embodiment, a negative bias voltage may be applied to the isolation conductive pattern 14 of the pixel isolation portion DTI of FIG. 5 through the first conductive pad 81. Thus, a white spot and/or a dark current may be reduced and/or prevented.

The insulating pattern 123 may fill a remaining portion of the fourth trench TR4. The insulating pattern 123 may penetrate the photoelectric conversion layer 150 and an entire and/or partial portion of the interconnection layer 200. The first capping pattern 125 may be provided on a top surface of the insulating pattern 123.

The bulk color filter 90 may be provided on the first conductive pad 81, the light blocking pattern 48b, and the first capping pattern 125. The bulk color filter 90 may cover at least a portion of the first conductive pad 81, the light blocking pattern 48b, and the first capping pattern 125. A first protective layer 71 may be provided on the bulk color filter 90 to seal or encapsulate the bulk color filter 90.

A photoelectric conversion region PD' and a dummy region PD" may be provided in the optical black region OB of the first substrate 1. For example, the photoelectric conversion region PD' may be doped with dopants having the second conductivity type different from the first conductivity type. The second conductivity type may be, for example, an N-type. In an embodiment, the photoelectric conversion region PD' may have a similar structure to that of the photoelectric conversion portion PD. However, the photoelectric conversion region PD' may not perform the same operation (e.g., an operation of receiving light to generate an electrical signal) as the photoelectric conversion portion PD. Alternatively or additionally, the dummy region PD" may not be doped with dopants. A signal generated by the dummy region PD" may be used as data for removing a process noise, for example.

In the pad region PAD, a second connection structure 130, a second conductive pad 83 and a second protective layer 73 may be provided on the first substrate 1. The second connection structure 130 may include a second connection line 131, an insulating pattern 133, and a second capping pattern 135.

The second connection line 131 may be provided on the back surface 1b of the first substrate 1. For example, the second connection line 131 may cover at least a portion of the back surface 1b and/or may conformally cover at least a portion of inner surfaces of a fifth trench TR5 and a sixth trench TR6. In an embodiment, the second connection line 131 may penetrate the photoelectric conversion layer 150 and the upper interconnection layer 221 to connect the photoelectric conversion layer 150 and the interconnection layer 200. That is, the second connection line 131 may be in contact with the interconnection lines in the lower interconnection layer 223. Thus, the second connection structure 130 may be electrically connected to the interconnection lines in the interconnection layer 200. The second connection line 131 may include, but not be limited to, a metal material (e.g., tungsten (W)).

The second conductive pad 83 may be provided in the fifth trench TR5 to fill a remaining portion of the fifth trench TR5. In an embodiment, the second conductive pad 83 may include a metal material (e.g., aluminum (Al)). The second conductive pad 83 may function as an electrical connection path between the image sensor and an external device. The insulating pattern 133 may fill a remaining portion of the sixth trench TR6. The insulating pattern 133 may penetrate the photoelectric conversion layer 150 and an entire or partial portion of the interconnection layer 200. The second capping pattern 135 may be provided on the insulating pattern 133.

Figure 24:
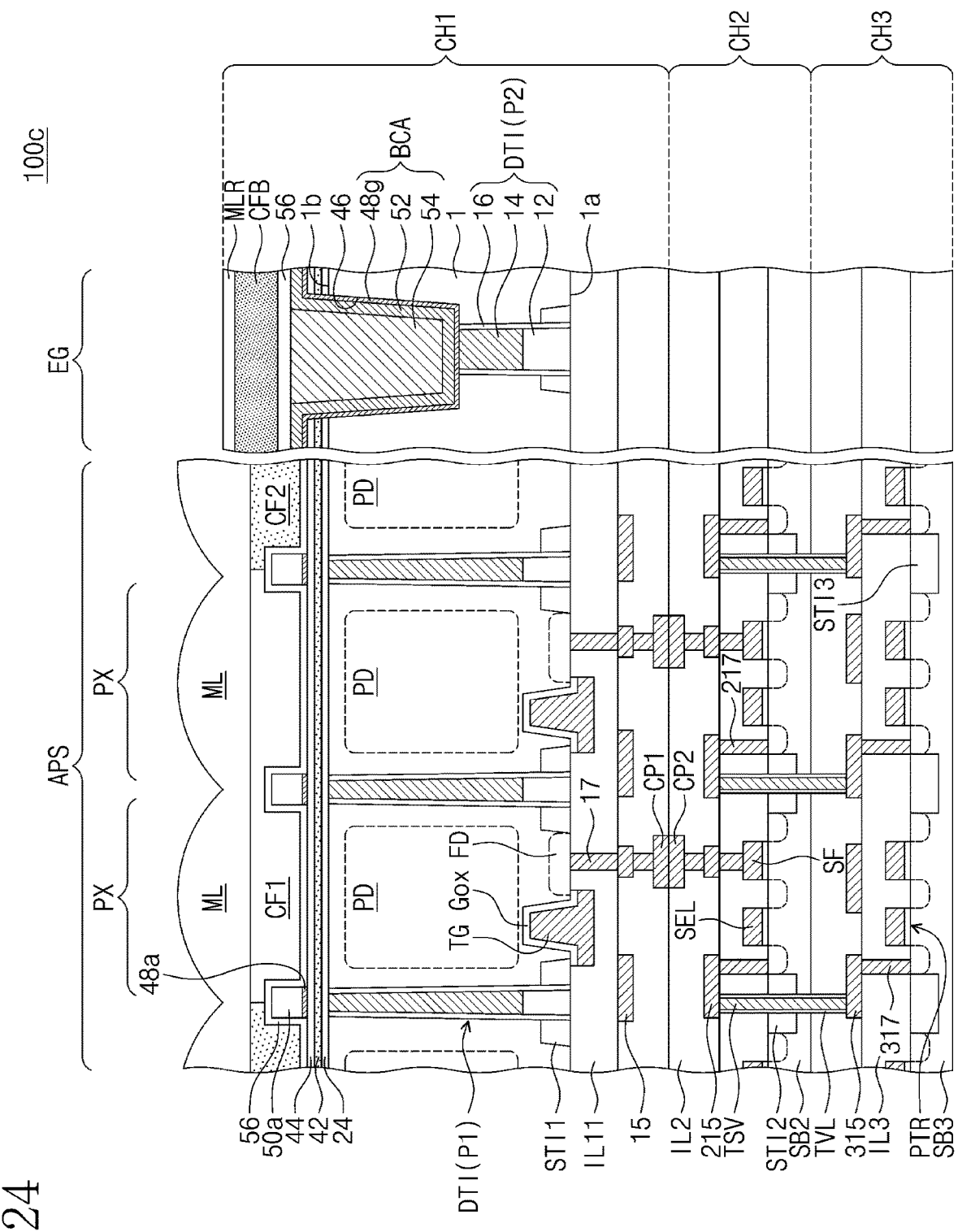
FIG. 24 is a cross-sectional view illustrating an image sensor, according to an embodiment.

FIG. 24 is a cross-sectional view illustrating an image sensor, according to an embodiment.

Referring to FIG. 24, an image sensor 100c may have a structure in which first to third sub-chips (e.g., first chip CH1, second chip CH2, and third chip CH3) may be stacked and/or may be bonded to each other. For example, the first sub-chip CH1 may perform an image sensing function. The first sub-chip CH1 may include or may be similar in many respects to the image sensor described above with reference to FIGS. 3 to 22B, and may include additional features not mentioned above.

In an embodiment, the first sub-chip CH1 may include transfer gates TG on a front surface 1a of a first substrate 1, and first interlayer insulating layers IL11 covering at least a portion of the transfer gates TG. The first substrate 1 may include a pixel array region APS and an edge region EG. The pixel array region APS may include a plurality of pixels PX. The edge region EG may correspond to a portion of the optical black region OB of FIG. 23.

A first device isolation portion STI1 may be disposed in the first substrate 1 to define active regions. A pixel isolation portion DTI may be disposed in the first substrate 1 to isolate/define the pixels PX in the pixel array region APS. The pixel isolation portion DTI may extend into the edge region EG. The pixel isolation portion DTI may include or may be similar in many respects to the pixel isolation portion DTI described above with reference to FIGS. 3 to 5, and may include additional features not mentioned above.

The first interlayer insulating layers IL11 may cover at least a portion of the front surface 1*a* of the first substrate 1. First interconnection lines 15 may be disposed between or in the first interlayer insulating layers IL11. A floating diffusion region FD may be connected to a corresponding one of the first interconnection lines 15 through a first contact plug 17. A first conductive pad CP1 may be disposed in a lowermost first interlayer insulating layer IL11. The first conductive pad CP1 may include copper.

In the edge region EG, a connection contact BCA may penetrate a first protective layer 44, a fixed charge layer 24 and a portion of the first substrate 1 so as to be in contact with the isolation conductive pattern 14 of the pixel isolation portion DTI. The connection contact BCA may be disposed in a third trench 46. The connection contact BCA may include a diffusion barrier pattern 48*g* conformally covering at least a portion of an inner sidewall and a bottom surface of the third trench 46, a first metal pattern 52 on the diffusion barrier pattern 48*g*, and a second metal pattern 54 filling the third trench 46. For example, the diffusion barrier pattern 48*g* may include titanium (Ti). The first metal pattern 52 may include, for example, tungsten (W). The second metal pattern 54 may include, for example, aluminum (Al). The diffusion barrier pattern 48*g* and the first metal pattern 52 may extend onto the first protective layer 44 so as to be electrically connected to other interconnection lines and/or vias/contacts.

A second protective layer 56 may be stacked on the first protective layer 44. The second protective layer 56 may conformally cover at least a portion of the light blocking pattern 48*a*, the low-refractive pattern 50*a* and the connection contact BCA.

In the edge region EG, a first optical black pattern CFB may be disposed on the second protective layer 56. For example, the first optical black pattern CFB may include the same material as a blue color filter.

In the edge region EG, a lens residual layer MLR may be disposed on the first optical black pattern CFB. The lens residual layer MLR may include the same material as micro lenses ML.

In an embodiment, the second sub-chip CH2 may include a second substrate SB2, selection gates SEL, source follower gates SF and reset gates which may be disposed on the second substrate SB2, and second interlayer insulating layers IL2 covering at least a portion of the second substrate SB2, the selection gates SEL, the source follower gates SF, and the reset gates. A second device isolation portion STI2 may be disposed in the second substrate SB2 to define active regions. Second contacts 217 and second interconnection lines 215 may be disposed in the second interlayer insulating layers IL2. A second conductive pad CP2 may be disposed in an uppermost second interlayer insulating layer IL2. The second conductive pad CP2 may include copper, for example. The second conductive pad CP2 may be in contact with the first conductive pad CP1. The source follower gates SF may be connected to the floating diffusion regions FD of the first sub-chip CH1, respectively.

In an embodiment, the third sub-chip CH3 may include a third substrate SB3, peripheral transistors PTR disposed on the third substrate SB3, and third interlayer insulating layers IL3 covering at least a portion of the peripheral transistors PTR. A third device isolation portion STI3 may be disposed in the third substrate SB3 to define active regions. Third contacts 317 and third interconnection lines 315 may be disposed in the third interlayer insulating layers IL3. An uppermost third interlayer insulating layer IL3 may be in contact with the second substrate SB2. A through-electrode TSV may penetrate the second interlayer insulating layer IL2, the second device isolation portion STI2, the second substrate SB2 and the third interlayer insulating layer IL3 to connect the second interconnection line 215 to the third interconnection line 315. A sidewall of the through-electrode TSV may be surrounded by a via insulating layer TVL. The third sub-chip CH3 may include circuits for driving the first sub-chip CH1 and/or the second sub-chip CH2. Alternatively or additionally, the third sub-chip CH3 may include circuits for storing electrical signals generated by the first sub-chip CH1 and/or the second sub-chip CH2.

In some embodiments, the active pixel sensor array of the image sensor may have a specific arrangement in which each of the pixel groups is configured to sense two colors, and thus the demosaic process may be omitted. As a result, noise caused by the demosaic process and moire may be prevented. Alternatively or additionally, the image sensor may be driven by low power and may obtain an image with improved real resolution (or modulation transfer function (MTF)) when compared to a related image sensor.

Alternatively or additionally, in the image sensor, the data on the green color may be obtained from all of the pixel groups in the binning operation. Thus, the data on the green color, which may be most sensitive to human eyes, may be sufficiently obtained to improve sensitivity. Alternatively or additionally, the number/amount of the data sampled for the red color and the blue color may be increased (e.g., doubled) to improve resolution, when compared to a related image sensor.

Furthermore, in the image sensor, the area of the effective light receiving region may be increased using the high-refractive patterns. Thus, the photosensitivity of the image sensor may be improved when compared to a related image sensor.

While the embodiments of the present disclosure have been particularly shown and described, it is to be understood by one of ordinary skill in the art that variations in form and detail may be made therein without departing from the spirit and scope of the attached claims. For example, any of the embodiments described above with reference to FIGS. 3 through 24 may be combined with each other.

What is claimed is:

1. An image sensor, comprising:
    a first pixel group disposed in a substrate, comprising:
        a first plurality of first sub-groups configured to sense first light of a first color, each of the first plurality of first sub-groups comprising first pixels arranged in N first rows and M first columns, N and M being positive integers greater than one; and
        a plurality of second sub-groups configured to sense second light of a second color, each of the plurality of second sub-groups comprising second pixels arranged in N second rows and M second columns;
    a second pixel group disposed in the substrate, arranged adjacent to the first pixel group, and comprising:
        a second plurality of first sub-groups configured to sense fourth light of the first color, each of the second plurality of first sub-groups comprising other first pixels arranged in N fourth rows and M fourth columns; and
        a plurality of third sub-groups configured to sense third light of a third color, each of the plurality of third sub-groups comprising third pixels arranged in N third rows and M third columns; and a conversion circuit configured to:
   determine a first color value based on a first combination of first values obtained from the first plurality of first sub-groups and the second plurality of first sub-groups;
   determine a second color value based on a second combination of second values obtained from the plurality of second sub-groups; and
   determine a third color value based on a third combination of third values obtained from the plurality of third sub-groups.

2. The image sensor of claim 1, wherein:
the first pixel group is configured to prevent sensing the third light, and
the second pixel group is configured to prevent sensing the second light.

3. The image sensor of claim 1, wherein:
the first plurality of first sub-groups in the first pixel group is arranged in a second direction intersecting a first direction, and
the plurality of second sub-groups in the first pixel group is arranged in a third direction intersecting the first direction and intersecting the second direction.

4. The image sensor of claim 3, wherein:
the second plurality of first sub-groups in the second pixel group is arranged in the second direction, and
the plurality of third sub-groups in the second pixel group is arranged in the third direction.

5. The image sensor of claim 1, further comprising:
first high-refractive patterns disposed on the substrate and respectively overlapping the first pixels;
second high-refractive patterns disposed on the substrate and respectively overlapping centers of the plurality of second sub-groups;
a planarization layer covering at least a portion of the first high-refractive patterns and the second high-refractive patterns;
third high-refractive patterns disposed on the planarization layer and respectively overlapping the first high-refractive patterns; and
fourth high-refractive patterns disposed on the planarization layer and respectively overlapping the second high-refractive patterns.

6. The image sensor of claim 5, wherein:
each of the first high-refractive patterns has a first width,
each of the second high-refractive patterns has a second width,
each of the third high-refractive patterns has a third width smaller than the first width, and
each of the fourth high-refractive patterns has a fourth width smaller than the second width.

7. The image sensor of claim 5, wherein each of the first high-refractive patterns, the second high-refractive patterns, the third high-refractive patterns, and the fourth high-refractive patterns are formed of a material having a first refractive index higher than a second refractive index of the planarization layer.

8. The image sensor of claim 1, further comprising:
a first conversion circuit configured to perform a first binning from each of the first plurality of first sub-groups, the second plurality of first sub-groups, the plurality of second sub-groups, and the plurality of third sub-groups, resulting in first image data comprising first data of the first color, second data of the second color, and third data of the third color; and
a second conversion circuit configured to perform a second binning using the first image data, resulting in second image data and third image data, the second image data comprising the first data of the first color, and the third image data comprising the second data of the second color and the third data of the third color.

9. The image sensor of claim 1, wherein the conversion circuit is further configured to:
process image data transferred from the first pixel group and the second pixel group;
expose the first pixel group to light for a first time duration in a first frame to make first image data;
expose the second pixel group to light for a second time duration in the first frame to make second image data, the second time duration being shorter than the first time duration;
expose the first pixel group to light for the second time duration in a second frame to make third image data;
expose the second pixel group to light for the first time duration in the second frame to make fourth image data, and
combine the first image data, the second image data, the third image data, and the fourth image data with each other.

* * * * *